(12) United States Patent
Kikkeri et al.

(10) Patent No.: US 8,855,369 B2
(45) Date of Patent: Oct. 7, 2014

(54) SELF LEARNING FACE RECOGNITION USING DEPTH BASED TRACKING FOR DATABASE GENERATION AND UPDATE

(75) Inventors: Harshavardhana Narayana Kikkeri, Bellevue, WA (US); Michael F. Koenig, Bellevue, WA (US); Jeffrey Cole, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 13/530,925

(22) Filed: Jun. 22, 2012

(65) Prior Publication Data

US 2013/0343600 A1    Dec. 26, 2013

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | | | |
|---|---|---|---|---|
| 5,164,992 A * | 11/1992 | Turk et al. | ...................... | 382/118 |
| 5,991,429 A * | 11/1999 | Coffin et al. | .................... | 382/118 |
| 6,108,437 A * | 8/2000 | Lin | ............................... | 382/118 |
| 7,142,697 B2 * | 11/2006 | Huang et al. | .................... | 382/118 |
| 7,203,367 B2 * | 4/2007 | Shniberg et al. | ............... | 382/224 |
| 7,843,495 B2 * | 11/2010 | Aas et al. | ..................... | 348/231.3 |
| 8,577,093 B2 * | 11/2013 | Friedman et al. | .............. | 382/115 |
| 2002/0136435 A1 * | 9/2002 | Prokoski | ........................ | 382/118 |
| 2003/0108244 A1 | 6/2003 | Li et al. | | |
| 2004/0008873 A1 * | 1/2004 | Sogo et al. | ..................... | 382/118 |
| 2005/0102246 A1 | 5/2005 | Movellan et al. | | |
| 2005/0144149 A1 | 6/2005 | Li et al. | | |
| 2007/0003113 A1 * | 1/2007 | Goldberg | ....................... | 382/118 |
| 2007/0223790 A1 | 9/2007 | Xiao et al. | | |
| 2009/0018980 A1 | 1/2009 | Zhang et al. | | |
| 2009/0022362 A1 * | 1/2009 | Gagvani et al. | ................ | 382/100 |
| 2009/0252383 A1 | 10/2009 | Adam et al. | | |
| 2011/0078097 A1 | 3/2011 | Thornton et al. | | |
| 2013/0176430 A1 * | 7/2013 | Zhu et al. | ....................... | 348/143 |
| 2013/0242031 A1 * | 9/2013 | Petterson et al. | ........... | 348/14.07 |

FOREIGN PATENT DOCUMENTS

| | | |
|---|---|---|
| WO | 2012057665 A1 | 5/2012 |
| WO | 2012071677 A1 | 6/2012 |

OTHER PUBLICATIONS

Dengpan, M., Autonomous face recognition, Dissertation, ULM University, Aug. 22, 2005, pp. 1-109.

(Continued)

*Primary Examiner* — Shervin Nakhjavan
(74) *Attorney, Agent, or Firm* — Steve Wight; Judy Yee; Micky Minhas

(57) ABSTRACT

Face recognition training database generation technique embodiments are presented that generally involve collecting characterizations of a person's face that are captured over time and as the person moves through an environment, to create a training database of facial characterizations for that person. As the facial characterizations are captured over time, they are will represent the person's face as viewed from various angles and distances, different resolutions, and under different environmental conditions (e.g., lighting and haze conditions). Further, over a long period of time where facial characterizations of a person are collected periodically, these characterizations can represent an evolution in the appearance of the person. This produces a rich training resource for use in face recognition systems. In addition, since a person's face recognition training database can be established before it is needed by a face recognition system, once employed, the training will be quicker.

20 Claims, 21 Drawing Sheets

(56) References Cited

OTHER PUBLICATIONS

Heisele, B., Face detection, retrieved Mar. 27, 2012, www.ai.mit.edu/research/abstracts/abstracts2000/pdf/z-heisele1.pdf, pp. 1-2.

Asthana, A., R. Goecke, N. Quadrianto, T. Gedeon, Learning based automatic face annotation for arbitrary poses and expressions from frontal images only, IEEE Conf. on Comp. Vision and Pattern Recognition, CVPR 2009, Jun. 20-25, 2009, pp. 1635-1642.

Darrell, T., G. Gordon, M. Harville, J. Woodfill, Integrated person tracking using stereo, color, and pattern detection, Int'l J. of Comp. Vision—Special Issue on a Special Section on Visual Surveillance, Jun. 2000, vol. 37, No. 2, pp. 175-185.

Xu, D., Y.-L. Chen, X. Wu, Y. Ou, Y. Xu, Integrated approach of skin-color detection and depth information for hand and face localization, 2011 IEEE Int'l Conf. on Robotics and Biomimetics, ROBIO 2011, Dec. 7-11, 2011, pp. 952-956, Karon Beach, Thailand.

\* cited by examiner

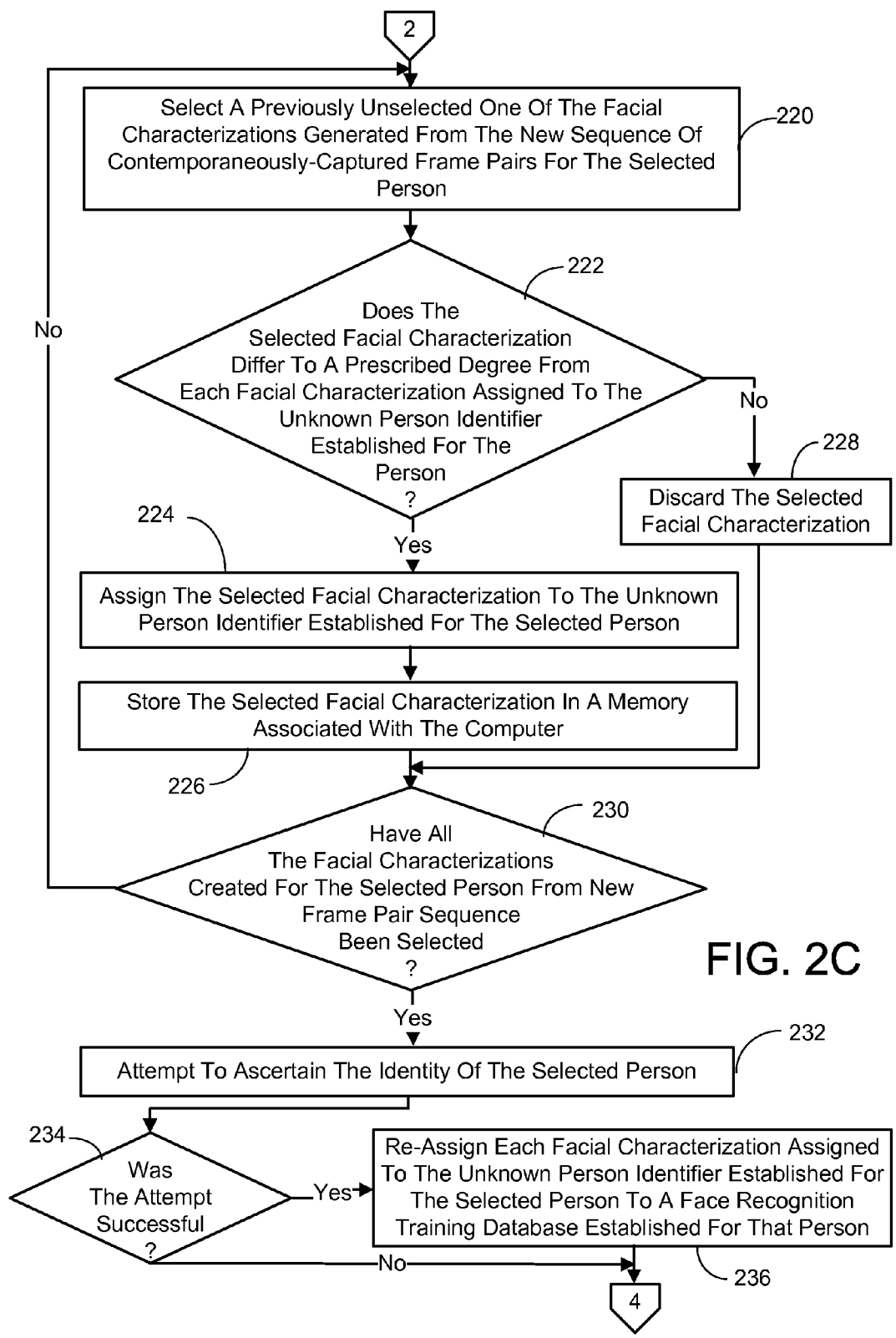

SELF LEARNING FACE RECOGNITION USING DEPTH BASED TRACKING FOR DATABASE GENERATION AND UPDATE

BACKGROUND

The problem of recognizing people depicted in an image from the appearance of their face has been studied for many years. Face recognition systems and processes essentially operate by comparing some type of model of a person's face to an image or characterization of the person's face extracted from an input image. These face models are typically obtained by training a face recognition systems using images of a person's face (or a characterization thereof). Thus, a database of training face images or characterizations is typically needed to train a face recognition system.

SUMMARY

Face recognition training database generation technique embodiments described herein generally involve collecting characterizations of a person's face that are captured over time and as the person moves through an environment, to create a training database of facial characterizations for that person. In one embodiment, a computer-implemented process is employed to generate a face recognition training database for each person detected in an environment. The process begins with inputting a sequence of contemporaneously-captured frame pairs. Each frame pair includes a frame output from a color video camera and a frame output from a depth video camera. Next, a face detection method and the color video camera frames are used to detect potential persons in the environment. In addition, a motion detection method and the depth video camera frames are used to detect potential persons in the environment.

Detection results generated via the foregoing face and motion detection methods are used to determine the location of one or more persons in the environment. The detection results generated via the face detection method also include a facial characterization of the portion of a color video camera frame depicting a person's face, for each potential person detected. For each person detected solely via the motion detection method, the process also includes identifying the corresponding location of that person in the contemporaneously-captured frame of the color video camera, and generating the facial characterization of that portion of the color video camera frame.

For each person detected in the environment, each facial characterization generated for that person is assigned to an unknown person identifier established specifically for the person, and stored in a memory associated with the computer being used to implement the process. An attempt is then made to ascertain the identity of each person. If the attempt is successful for a person, each facial characterization assigned to the unknown person identifier established for that person is re-assigned to a face recognition training database established for the person.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

FIGS. 2A-E are a flow diagram generally outlining one embodiment of a computer-implemented process for generating or supplementing a face recognition training database for each person detected in an environment based on a new sequence of contemporaneously-captured frame pairs.

DETAILED DESCRIPTION

Figure 1A:
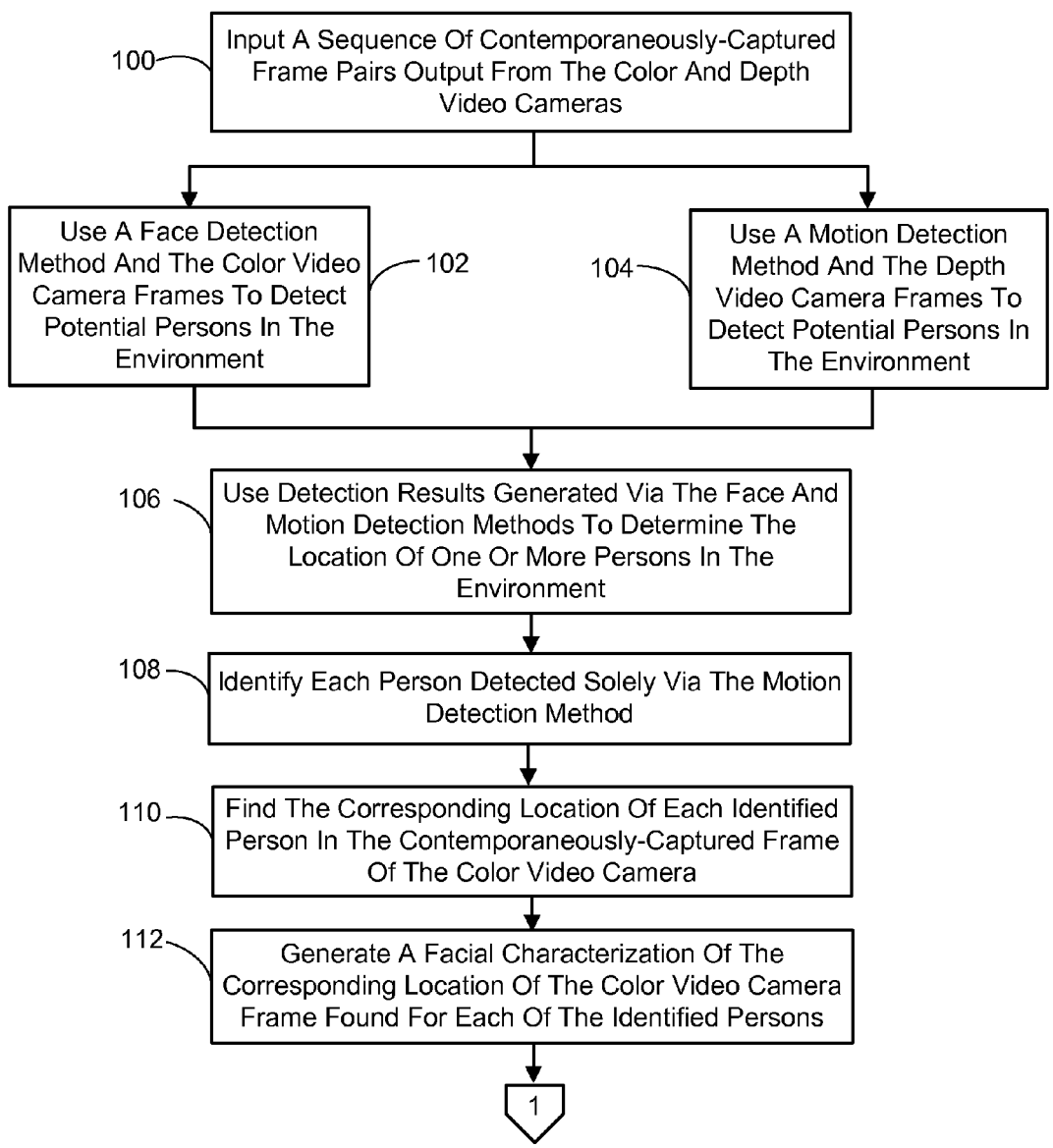
FIGS. 1A-B are a flow diagram generally outlining one embodiment of a computer-implemented process for generating a face recognition training database for each person detected in an environment.

In the following description of face recognition training database generation technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

It is also noted that specific terminology will be resorted to in describing the present invention for the sake of clarity and it is not intended for the present invention to be limited to the specific terms so chosen. Furthermore, it is to be understood that each specific term comprises all its technical equivalents that operate in a broadly similar manner to achieve a similar purpose. Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of process flow representing one or more embodiments of the invention do not inherently indicate any particular order nor imply any limitations of the invention.

1.0 Training Database Generation for Use in Face Recognition Systems

Face recognition training database generation technique embodiments described herein generally involve collecting characterizations of a person's face that are captured over time and as the person moves through an environment, to create a training database of facial characterizations for that person. As the facial characterizations are captured over time, they are will represent the person's face as viewed from various angles and distances, different resolutions, and under different environmental conditions (e.g., lighting and haze conditions). Still further, over a long period of time where facial characterizations of a person are collected periodically, these characterizations can represent an evolution in the appearance of the person. For example, the person could gain or lose weight; grow or remove facial hair; change hairstyles; wear different hats; and so on. Thus, the resulting training database can be established and populated before training even begins, and added to over time to capture the aforementioned changes in the person's facial pose and appearance. This produces a rich training resource for use in face recognition systems. In addition, since a person's face recognition training database can be established before it is needed by a face recognition system, once employed, the training will be quicker. Still further, the face recognition training database generation technique embodiments described herein can generate training databases for multiple people found in the environment. Also, existing databases can be updated with incremental changes in faces. This allows a person face changes to be captured gradually enough to allow recognition of persons even when they features have substantially changed over a period of time. For example, if a person is growing a beard, their facial features will slowly change. However, since each day the change is small enough that the new face with partial beard can be added to the database. This way when the person's beard is fully grown, he can still be recognized, even though no manual training was done using this face. Same principle applies to any gradual changes due to age, body weight, and so on.

It is noted that the term "environment" as used throughout this disclosure should be interpreted broadly as any external surroundings of a person. This includes indoor settings, outdoor settings, or combination of both.

1.1 Process for Generating a Face Recognition Training Database

Figure 1B:
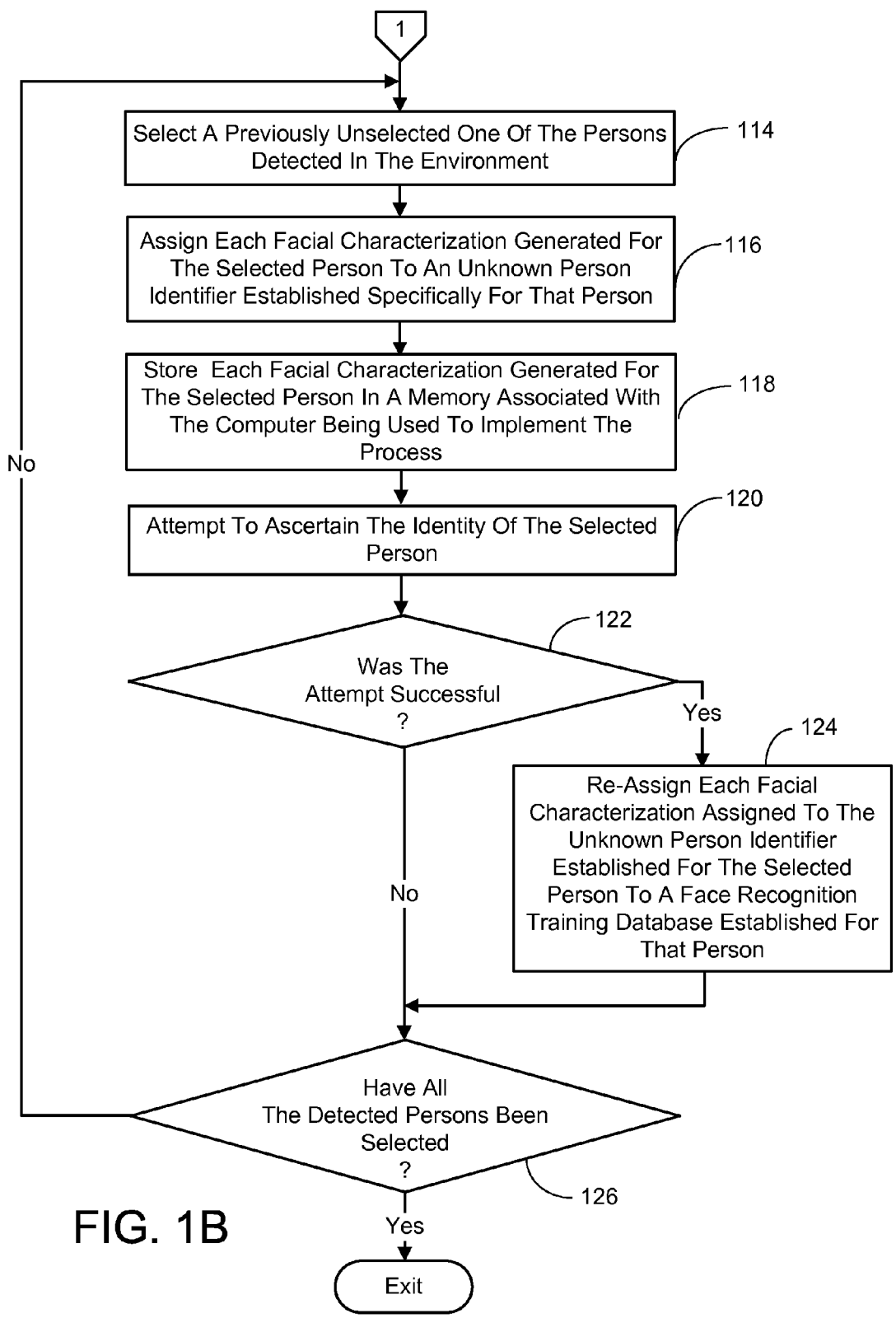
Figure 2A:
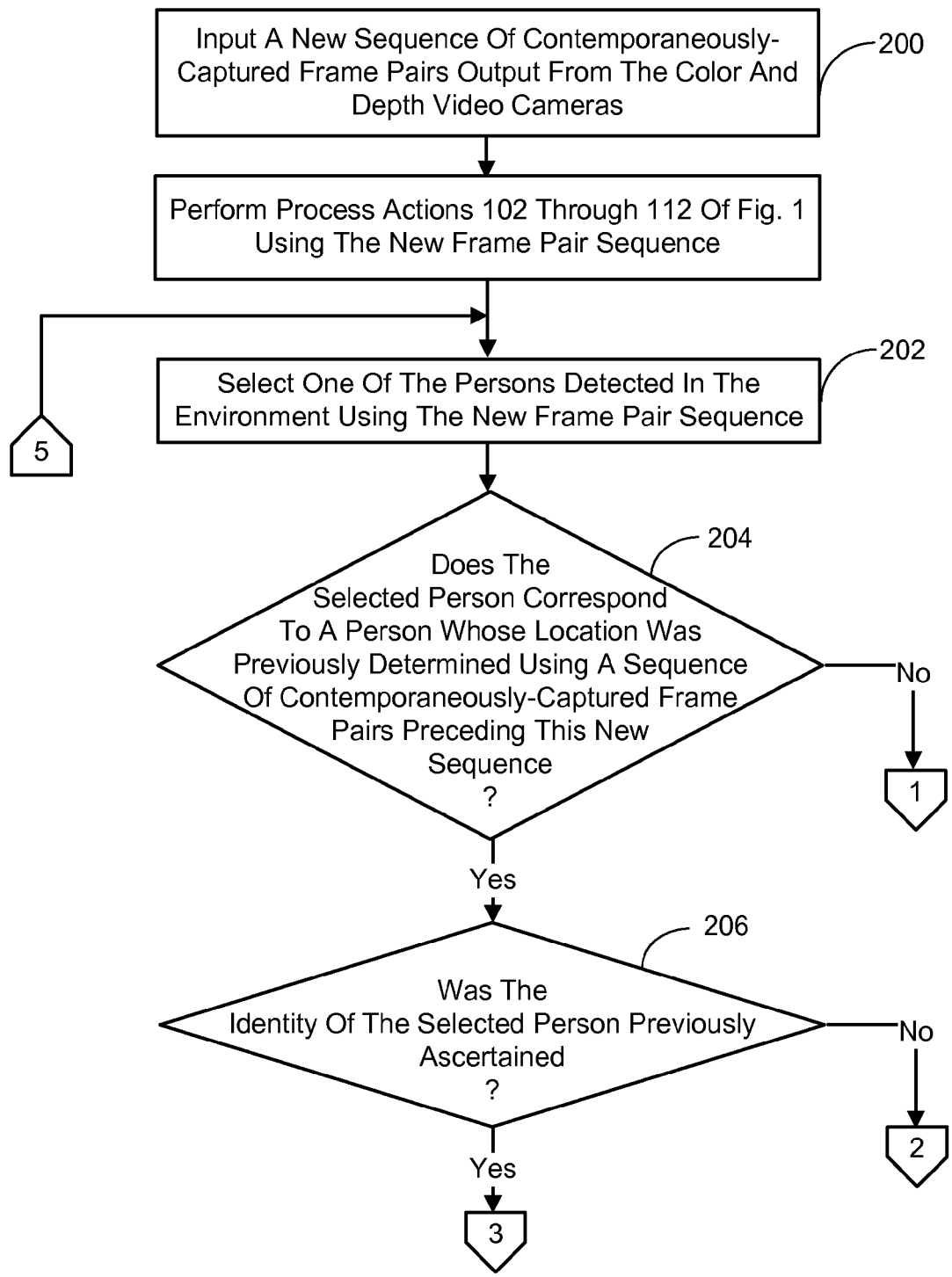
Figure 2B:
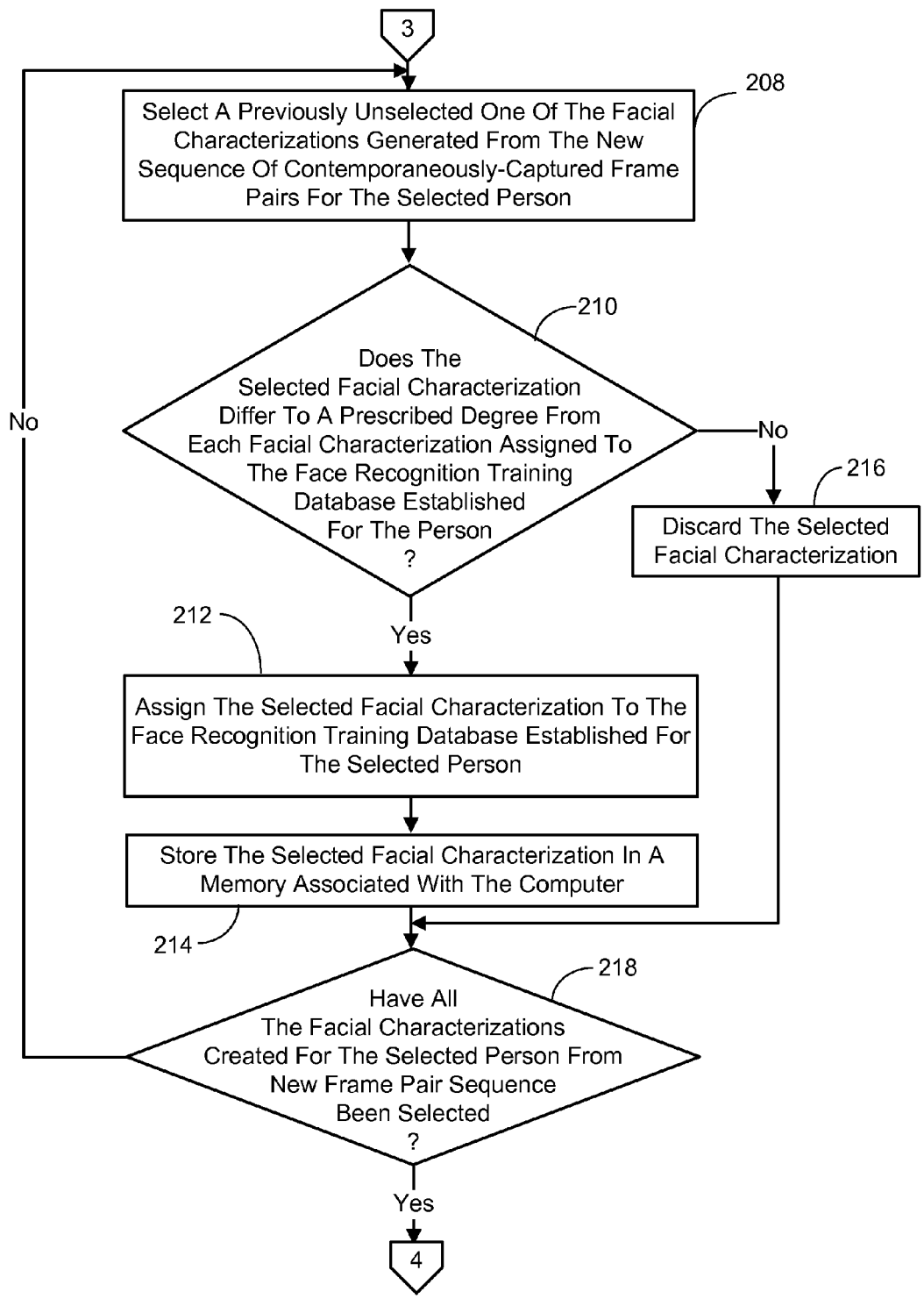
Figure 2D:
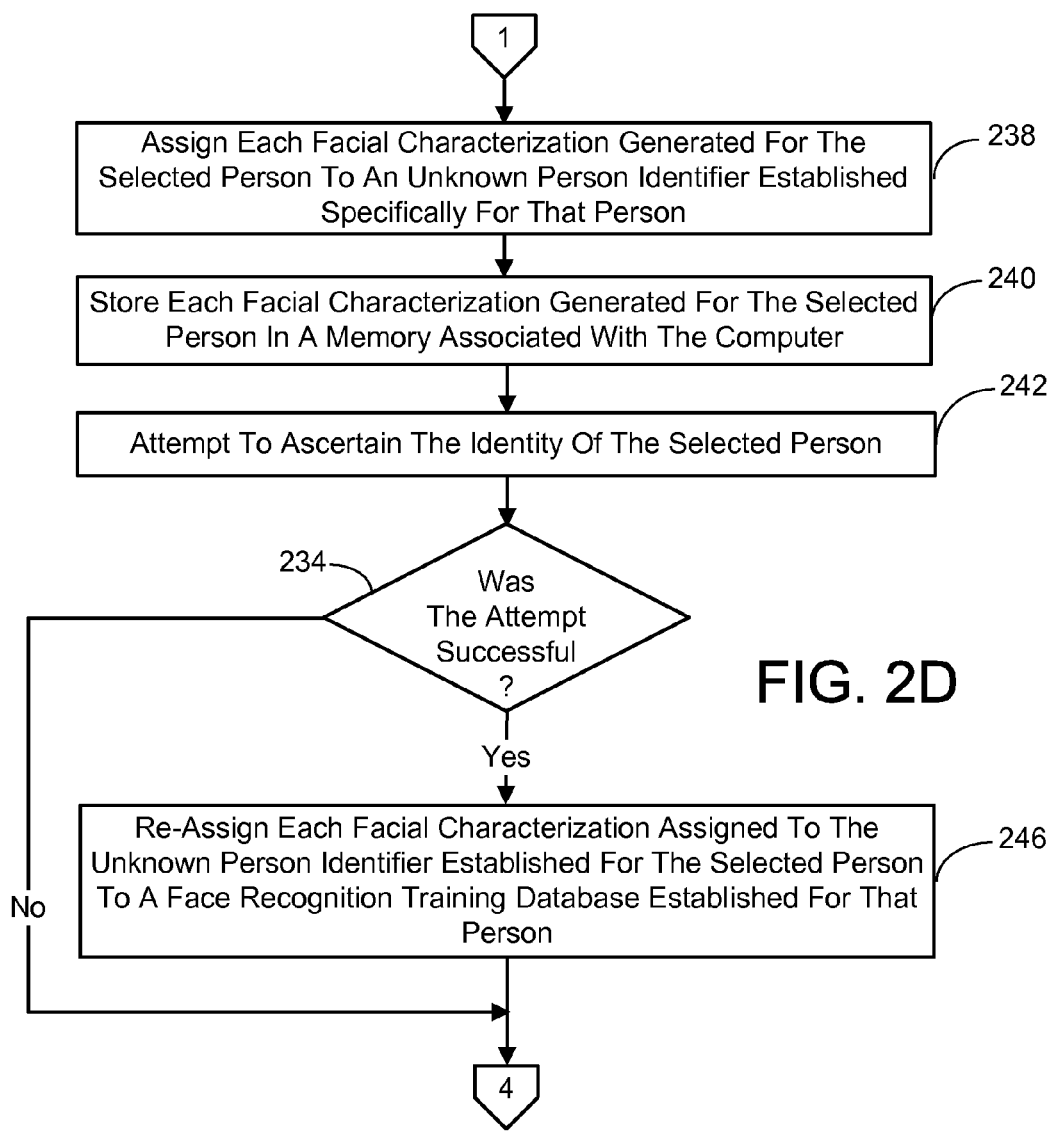
Figure 2E:
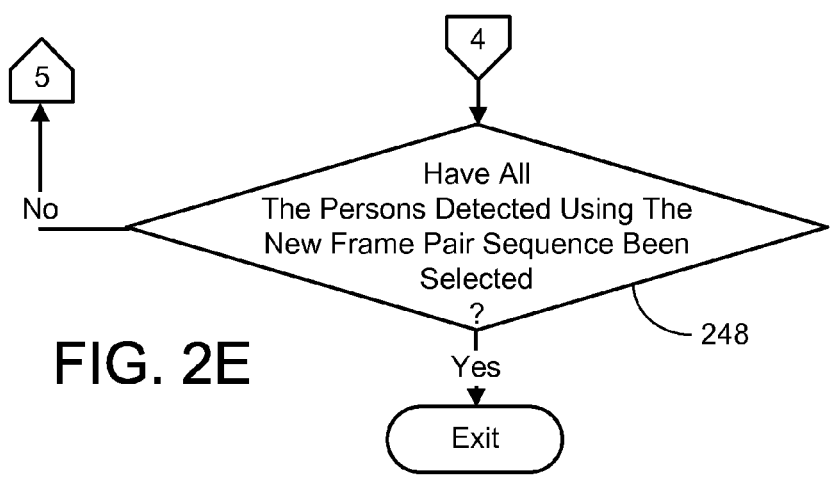

With reference to FIGS. 1A-B, one embodiment of a computer-implemented process for generating a face recognition training database for each person detected as being located in an environment is presented. The process begins with inputting a sequence of contemporaneously-captured frame pairs (process action 100). Each frame pair includes a frame output from a color video camera and a frame output from a depth video camera. The cameras are synchronized in that each camera captures an image of the scene at the same time. Thus, a contemporaneous pair of color and depth frames is produced each time the scene is captured. Next, a face detection method and the color video camera frames are used to detect potential persons in the environment (process action 102). It is noted that any appropriate face detection method that employs color video frames can be adopted to accomplish the foregoing task. In addition, a motion detection method and the depth video camera frames are used to detect potential persons in the environment (process action 104). It is noted that any appropriate motion detection method that employs depth video frames can be adopted to accomplish the foregoing task. In one implementation (as illustrated in FIG. 1A), process actions 102 and 104 are accomplished at approximately the same time.

Detection results generated via the foregoing face and motion detection methods are used to determine the location of one or more persons in the environment (process action 106). The detection results generated via the face detection method also include a facial characterization of the portion of a color video camera frame depicting a person's face, for each potential person detected. The type of facial characterization is specific to the particular face detection method employed and is compatible with the aforementioned face recognition system that will use the training database being generated. Each person detected solely via the motion detection method is identified next (process action 108), and the corresponding location of each identified person is found in the contemporaneously-captured frame of the color video camera (process action 110). In addition, a facial characterization of that portion of the color video camera frame is generated for each of the identified persons (process action 112).

The process continues with the selection of a previously unselected one of the persons detected in the environment (process action 114). Each facial characterization generated for the selected person is assigned to an unknown person identifier established specifically for that person (process action 116), and stored in a memory associated with the computer being used to implement the process (process action 118). The aforementioned computer can be, for example, one of the computers described in the Exemplary Operating Environments section of this disclosure.

It is pointed out that to this point in the procedure, the facial characterizations have been assigned to an unknown person identifier. In this way, even though the identity of the detected person is not yet known, facial characterization are being created and saved. Thus, if the detected person's identity is ultimately established, the saved facial characterizations can be re-assigned to a face recognition training database established for that person. To this end, the process continues with an attempt to ascertain the identity of the person (process action 120). This identification action is accomplished using any appropriate conventional method, including inviting the unknown person interact with the computer to provide the identifying information. It is next determined if the attempt was successful (process action 122). If so, each facial characterization assigned to the unknown person identifier established for the selected person is re-assigned to a face recognition training database established for that person (process action 124). Regardless of whether the attempt of process action 120 was successful or not, it is next determined if all the detected persons have been selected (process action 126). If not, process actions 114 through 126 are repeated, until all the detected persons have been selected and considered. At that point the process ends.

1.2 Subsequently-Captured Frame Pair Sequences

In order to prevent a situation where a person detected in a sequence of subsequently-captured frame pairs is associated with a new unknown person identifier, even though such an identifier was previously issued to that same person, the location of each person detected in the foregoing process is tracked. Any appropriate convention tracking method can be employed for this purpose. Thus, in analyzing future frame pair sequences, it will be known that a detected person was previously detected and associated with either an unknown person indicator or face recognition training database. In this way, the facial characterizations created for the person can be assigned to the appropriate collection, and a new unknown person identifier need not be established.

Given the foregoing, multiple possibilities exist as to how persons detected in subsequently-captured frame pair sequences would be handled. For example, if the person detected was detected previously and has been tracked, any facial characterization created from the new sequence would be assigned either to that person's existing unknown person identifier if the person was not previously identified, or to that person's face recognition training database if the person had been previously identified. On the other hand, if the detected person is new to the scene, then an unknown person identifier would be created and assigned to the facial characterizations produced. Additionally, whenever facial characterizations are assigned to an unknown person indicator (albeit an existing one or new one), an attempt to identify the person would be made.

More particularly, with reference to FIGS. 2A-E, in one embodiment when a new sequence of contemporaneously-captured frame pairs becomes available, it is input (process action 200). Process actions 102 through 112 of FIG. 1 are then performed using the new frame pair sequence.

The process then continues with the selection of one of the persons detected in the environment using the new frame pair sequence (process action 202). It is then determined if the selected person corresponds to a person whose location was previously determined using a sequence of contemporaneously-captured frame pairs preceding the new sequence (process action 204). As indicated previously, in one embodiment this is done by tracking the location of the previously detected person over time. If it is determined that the person corresponds to such a previously detected person, it is next determined if the identity of the person was previously ascertained (process action 206). If the identity of the person was previously ascertained, then a previously unselected one of the facial characterizations generated from the new sequence of contemporaneously-captured frame pairs for this person is selected (process action 208). It is noted that the facial characterizations are generated as described previously. It is determined if the selected facial characterization differs to a prescribed degree from each facial characterization assigned to the face recognition training database established for the person (process action 210). If it does differ to the prescribed degree, the selected facial characterization is assigned to the face recognition training database established for the selected person (process action 212), and is stored in a memory associated with the computer (process action 214). Otherwise it is discarded (process action 216). In any event, it is then determined if all the facial characterizations created for the selected person from new frame pair sequence have been selected (process action 218). If not, process actions 208 through 218 are repeated, until all the facial characterizations have been selected and considered.

However, if it is determined in process action 206 that the identity of the selected person was not previously ascertained, then a previously unselected one of the facial characterization generated from the new sequence of contemporaneously-captured frame pairs for this person is selected (process action 220). It is then determined if the selected facial characterization differs to a prescribed degree from each facial characterization assigned to the unknown person identifier established for the person (process action 222). If it does differ to the prescribed degree, the selected facial characterization is assigned to the unknown person identifier established for the selected person (process action 224), and is stored in a memory associated with the computer (process action 226). Otherwise it is discarded (process action 228). In either case, it is then determined if all the facial characterizations created for the selected person from new frame pair sequence have been selected (process action 230). If not, process actions 220 through 230 are repeated, until all the facial characterizations have been selected and considered. The process then continues with an attempt to ascertain the identity of the person (process action 232). As before, this identification action is accomplished using any appropriate conventional method, including inviting the unknown person interact with the computer to provide the identifying information. It is next determined if the attempt was successful (process action 234). If so, each facial characterization assigned to the unknown person identifier established for the selected person is re-assigned to a face recognition training database established for that person (process action 236).

There is also a possibility that the selected person is new to the environment or was not detected in the past. To this end, if it is determined in process action 204 that the selected person does not correspond a person whose location was previously determined using a sequence of contemporaneously-captured frame pairs preceding said new sequence, then each facial characterization generated for the selected person is assigned to an unknown person identifier established specifically for that person (process action 238), and stored in a memory associated with the computer being used to implement the process (process action 240). Next, an attempt is made to ascertain the identity of the person (process action 242). It is then determined if the attempt was successful (process action 244). If so, each facial characterization assigned to the unknown person identifier established for the selected person is re-assigned to a face recognition training database established for that person (process action 246).

Once the currently selected person has been considered as outlined above, it is determined if all the persons detected in the environment using the new frame pair sequence have been selected (process action 248). If not, process actions 202 through 248 are repeated, until all the detected persons have been selected and considered. At that point the current iteration of the process ends. However, the process can be repeated the next time new sequence of contemporaneously-captured frame pairs becomes available.

Face recognition methods typically use facial characterizations such as those described previously in identifying a person from an image of their face. With regard to the foregoing process actions for attempting to ascertain the identity of the person, it is noted that the facial characterizations generated for that person and assigned to that person's unknown person identifier can be employed in the attempt.

1.2.1 Unidentifiable Person

Figure 3:
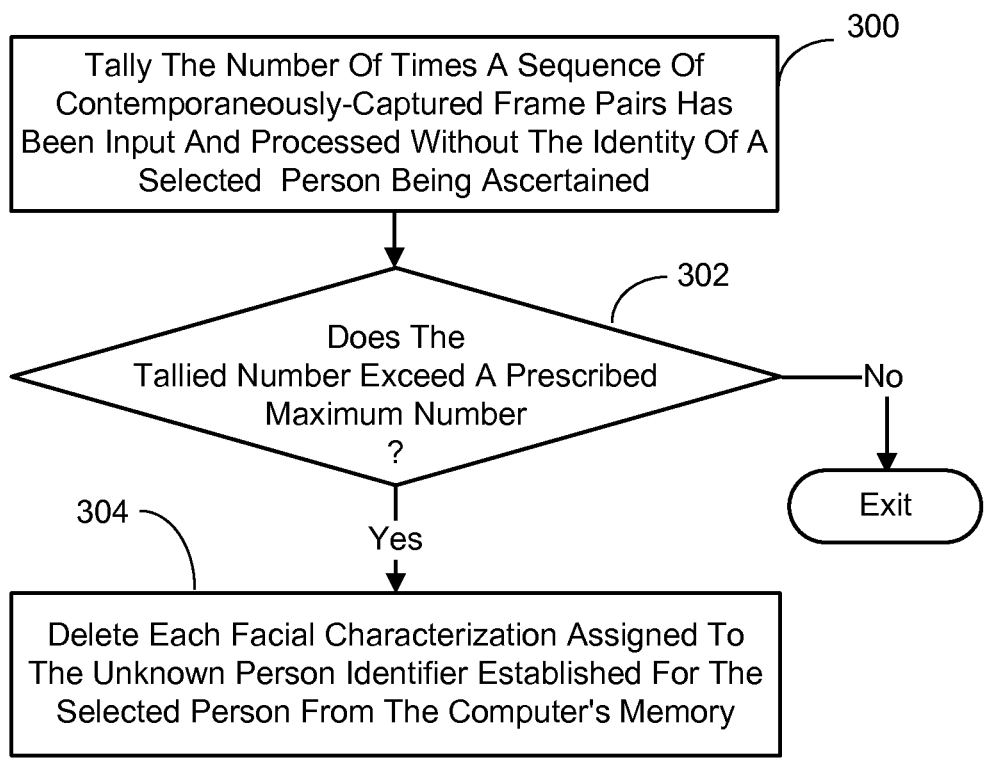
FIG. 3 is a flow diagram outlining one embodiment of a computer-implemented process for discarding facial characterization assigned to the unknown person identifier whenever the person remains unidentified for more than a prescribed number of attempts to identify the person.

There is also a possibility in the foregoing processes that a detected person will never be identified. In order to conserve memory space, in one embodiment as outlined in FIG. 3, if it is determined in any one of process actions 122, 234, or 244 that the identity of the selected person was not ascertained, then the number of times a sequence of contemporaneously-captured frame pairs had been input and processed without the identity of that person being ascertained is tallied (process action 300). It is then determined if the tallied number exceeds a prescribed maximum number, e.g., 100 (process action 302). If it does not, then the processes outlined above continue unabated, and this memory conserving procedure ends. However, if the tallied number does exceed the prescribed maximum number, then each facial characterization assigned to the unknown person identifier established for the selected person is deleting from the computer's memory (process action 304).

1.2.2 Zooming Scheme

Figure 4:
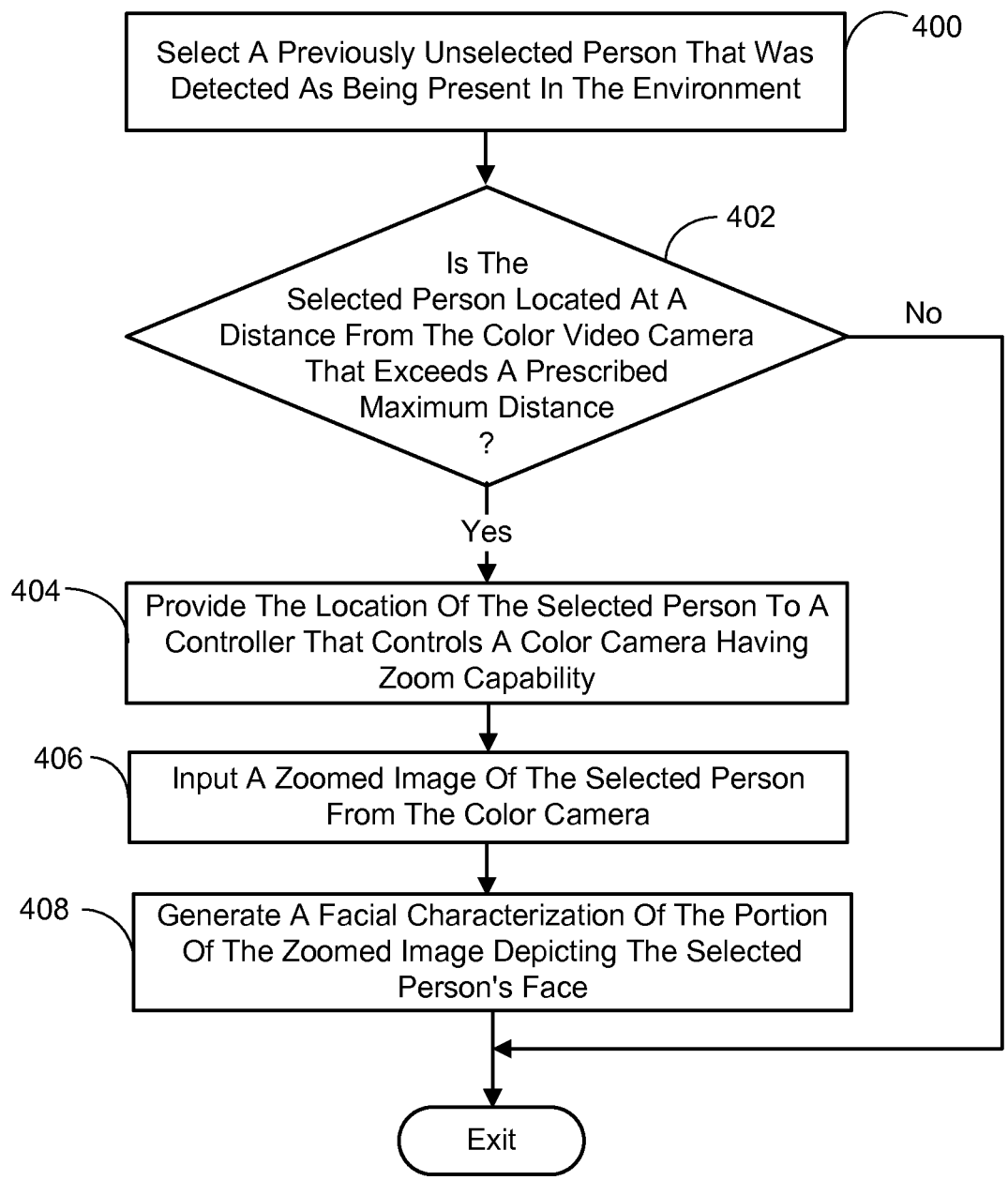
FIG. 4 is a flow diagram outlining one embodiment of a computer-implemented process for capturing a zoomed in image of a person located in the environment at a distance from the color video camera that exceeds a prescribed maximum distance.

It is noted that many face recognition methods which can be employed in connection with the face recognition training database generation technique embodiments described herein, will often not be able to recognize a person who is detected in the environment, but located at a significant distance from the cameras. Although not necessarily so, the foregoing situation can occur when a person is detected solely via the motion detection method. This situation can be addressed using a zooming scheme. This zooming scheme is accomplished prior to assigning each facial characterization generated for a person to an unknown person identifier established for that person. More particularly, referring to FIG. 4, in one embodiment, a previously unselected person detected (by any of the aforementioned methods) as being present in the environment, is selected (process action 400). It is then determined if the selected person is located in the environment at a distance from the color video camera that exceeds a prescribed maximum distance, e.g., 3 meters (process action 402). If so, the location of the selected person is provided to a controller that controls a color camera having zoom capability (process action 404). The controller causes the color camera to zoom in on the face of the selected person to a degree proportional to the distance from the color video camera to the person, and then to capture a zoomed image of the person's face. It is noted that the color camera can be the aforementioned color video camera or a separate camera positioned so as to capture images of the environment. The degree of zoom is computed such that given the distance from the camera to the selected person, the resulting image will depict the person's face with a resolution conducive for face recognition. The zoomed image is then input (process action 406), and a facial characterization of the portion of the zoomed image depicting that person's face is generated (process action 408). This facial characterization is then assigned along with all the others generated for the selected person to the unknown person identifier established for that person.

1.3 Additional Color and Depth Video Cameras

The environment in which the face recognition training database generation technique embodiments described herein operate can be quite large. As such, in one embodiment, more than one pair of color and depth video cameras is employed to cover the environment. Given that more than one pair of cameras is available in the environment, they can be configured to capture the same scene, but from different points of view. This scenario allows more facial characterizations to be generated in the same period of time—either for the same people detected by the different pairs of camera, or for different people when one pair of cameras cannot "see" a person that another pair can "see". In this regard, it is advantageous for each pair of cameras to know the location of people in the scene so that it can be readily determined whether a person is the same person detected using another camera pair, or a different person. In one embodiment this is accomplished by configuring the camera pairs to capture frame pairs substantially contemporaneously. In this way the location of a person computed by one pair of camera would match that computed by another pair if it is the same person, and not match if it is a different person.

1.3.1 Capturing the Same Scene but from a Different Point of View

Figure 5A:
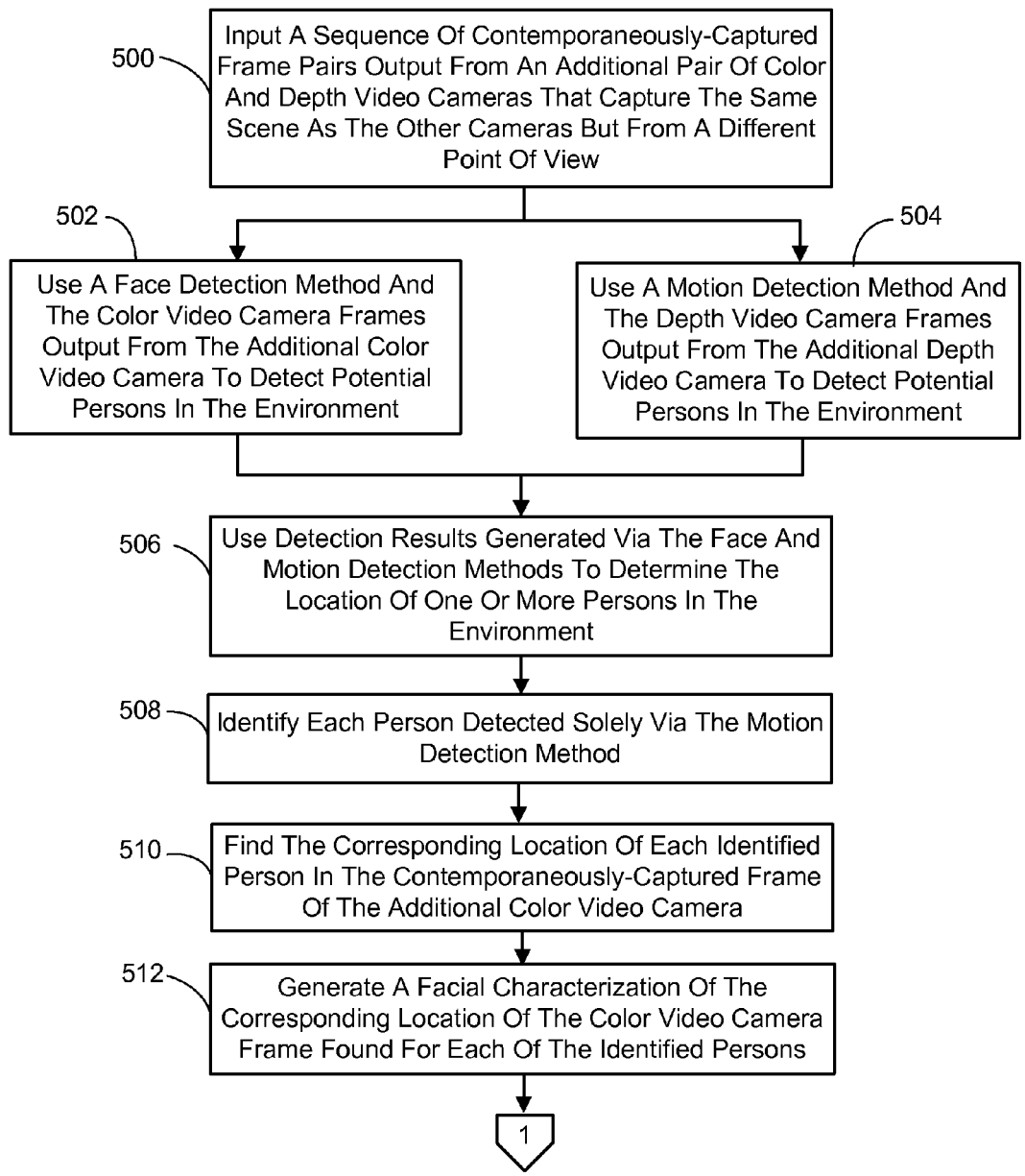
FIGS. 5A-C are a flow diagram generally outlining one embodiment of a computer-implemented process for generating or supplementing a face recognition training database for each person detected in an environment based on a sequence of contemporaneously-captured frame pairs output by an additional pair of color and depth video cameras capturing the scene from a different point of view.
Figure 5B:
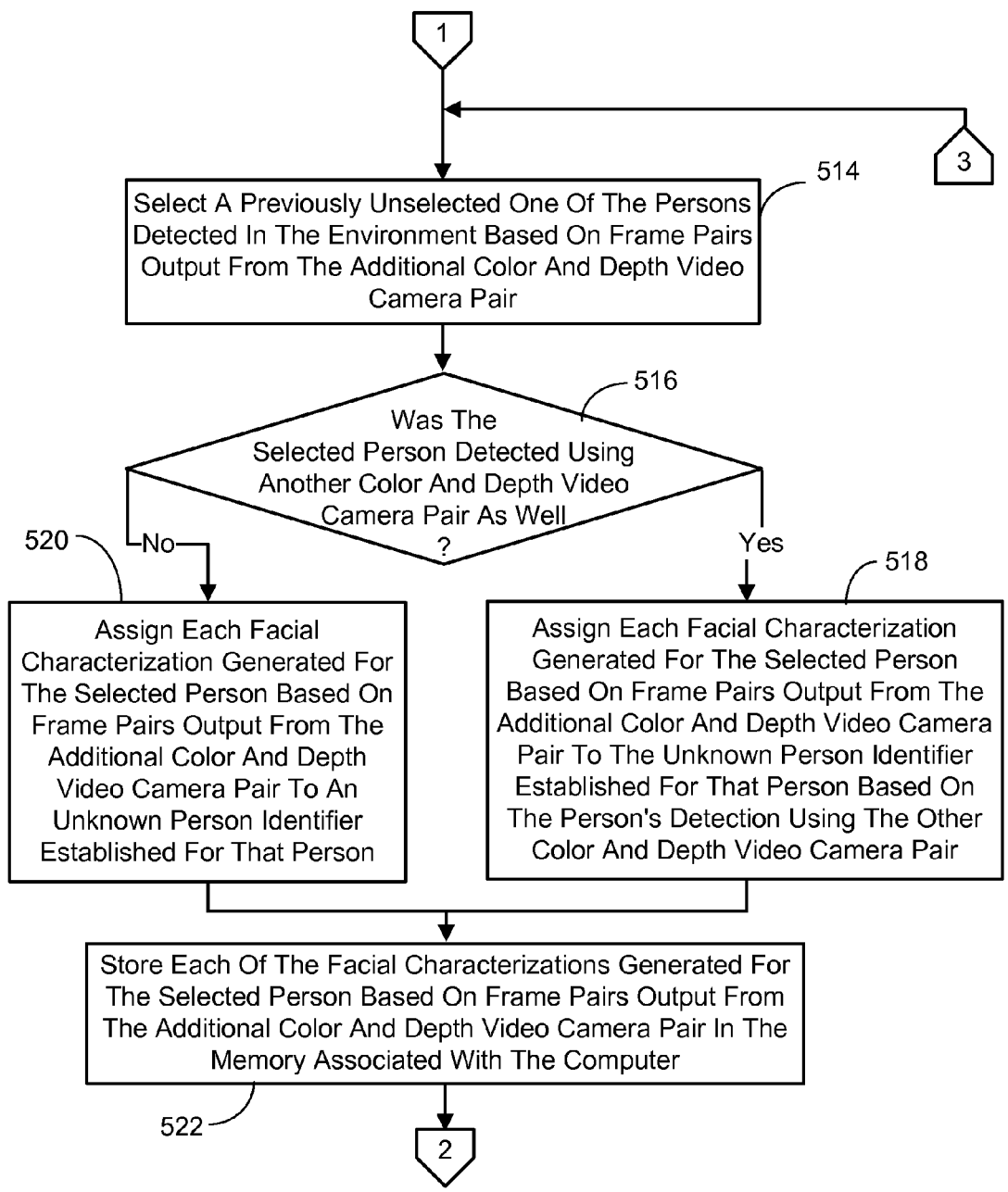
Figure 5C:
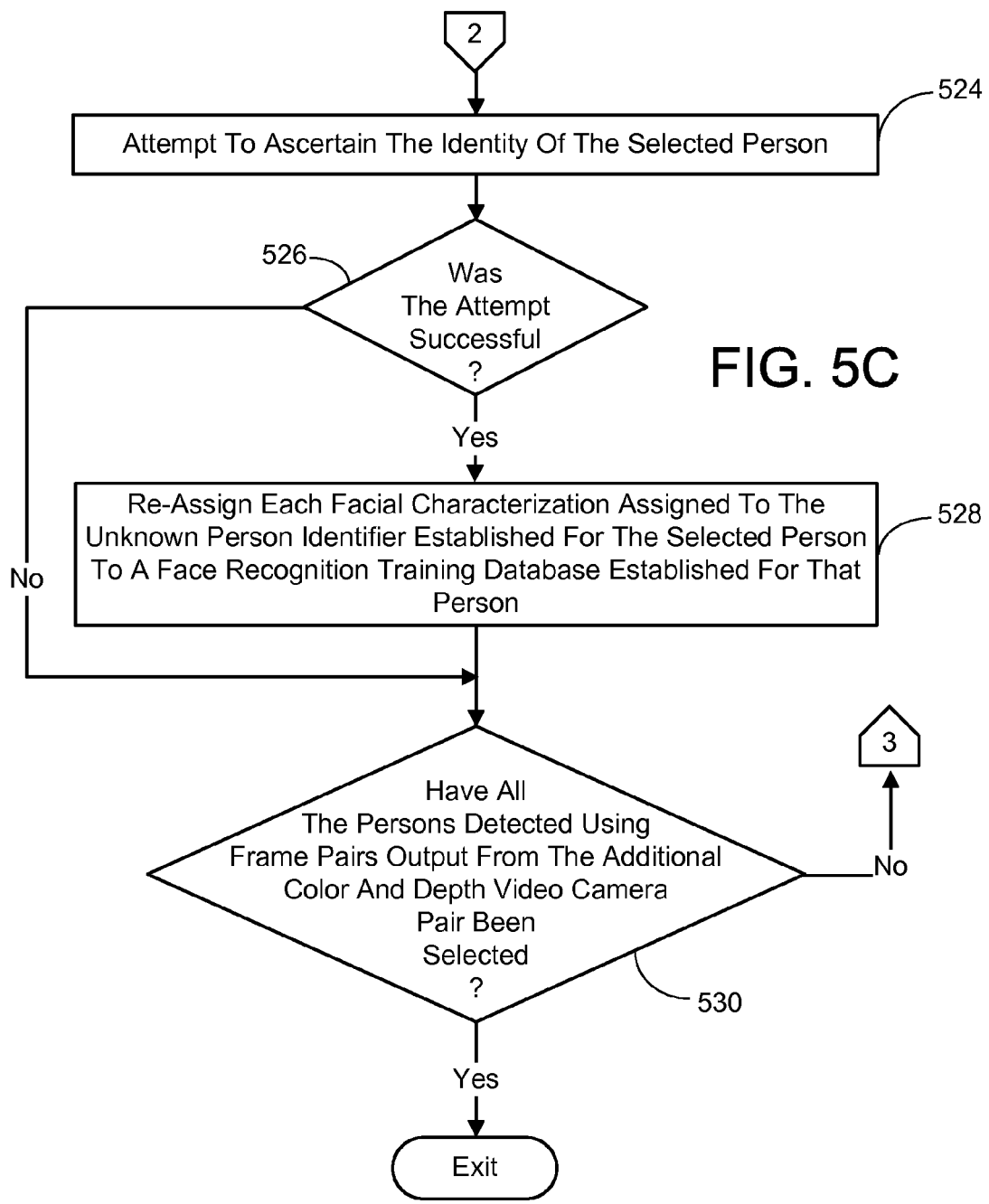
Figure 6A:
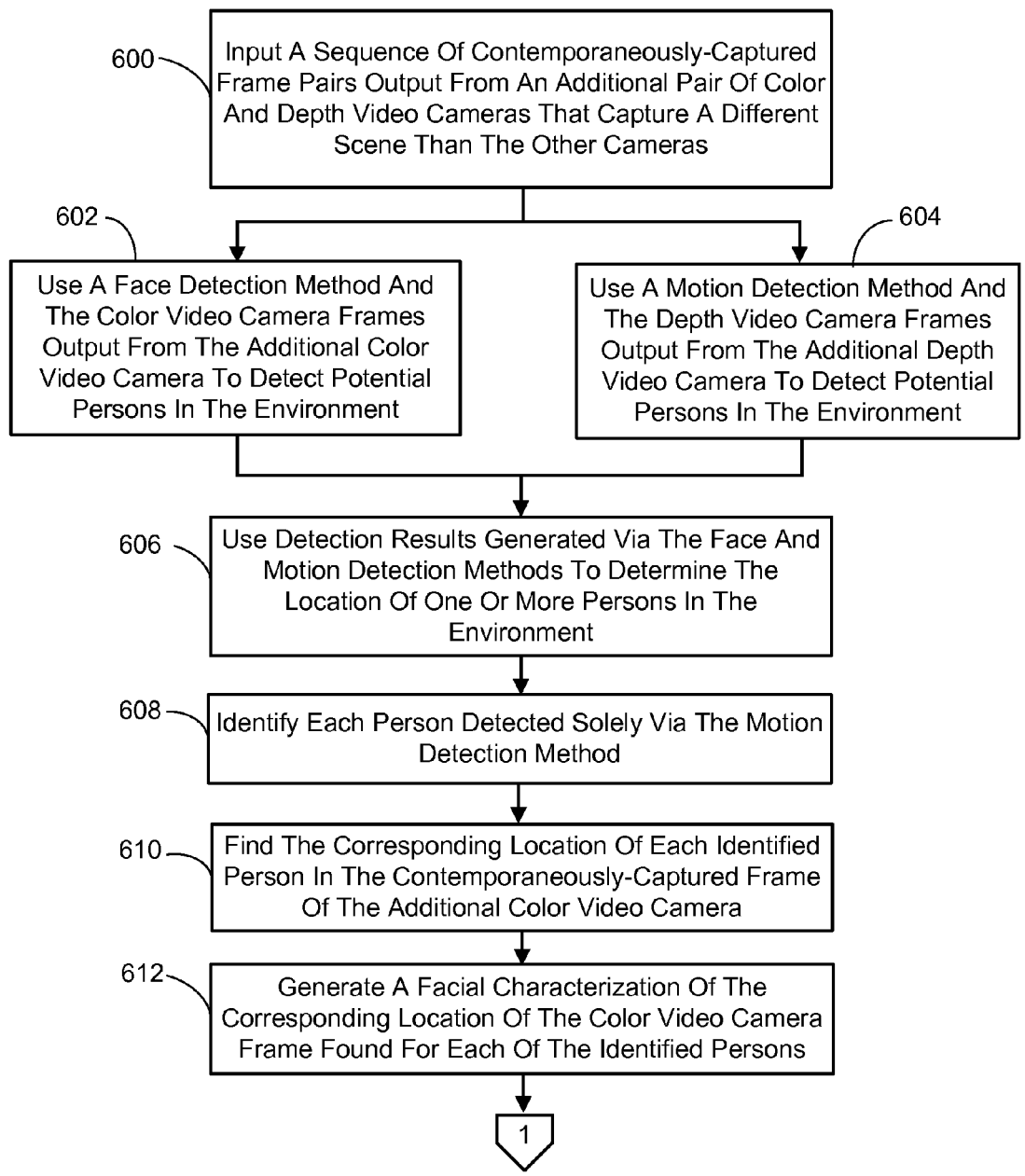
FIGS. 6A-F are a flow diagram generally outlining one embodiment of a computer-implemented process for generating or supplementing a face recognition training database for each person detected in an environment based on a sequence of contemporaneously-captured frame pairs output by an additional pair of color and depth video cameras capturing a different scene within the environment.
Figure 6B:
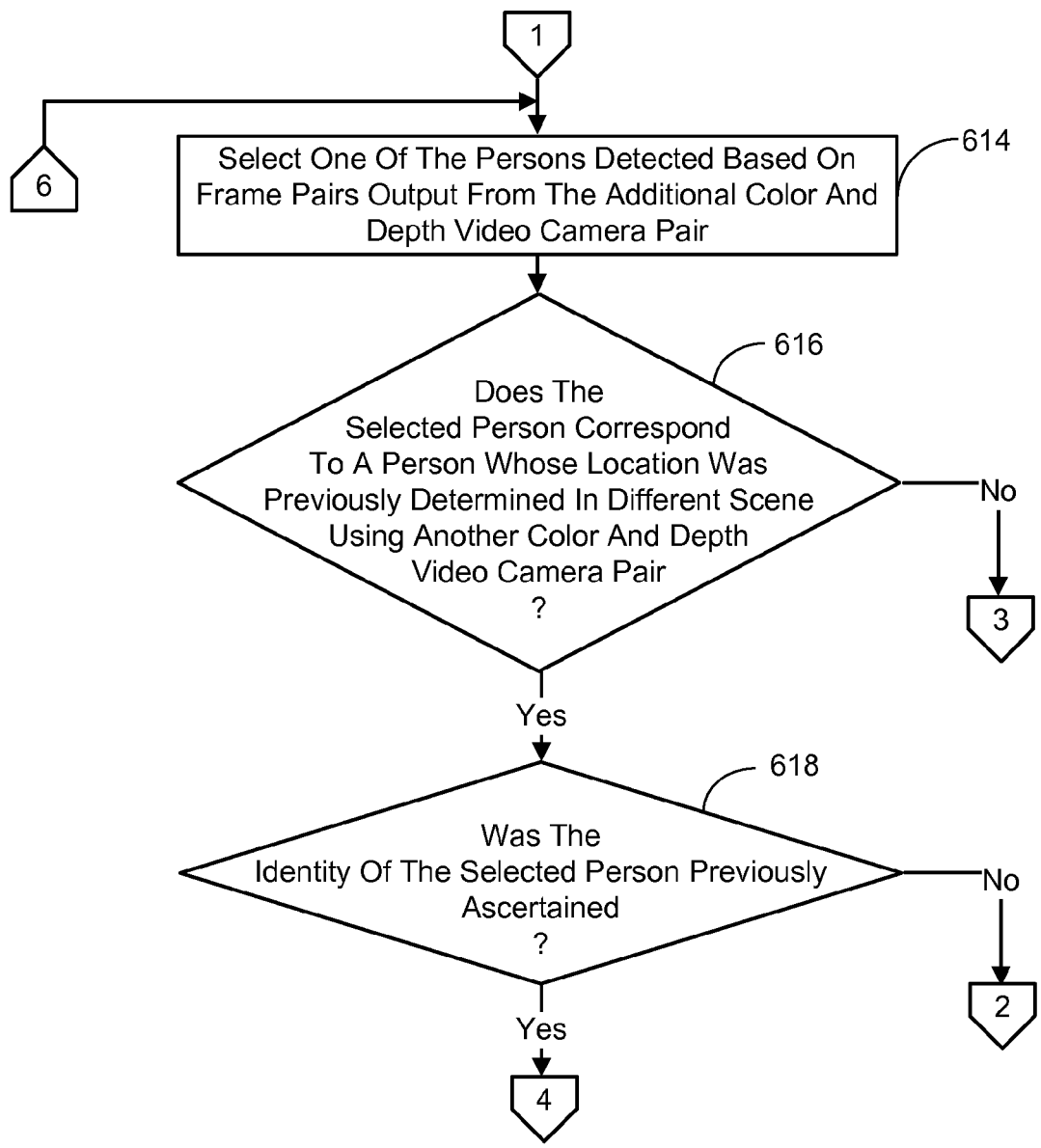
Figure 6C:
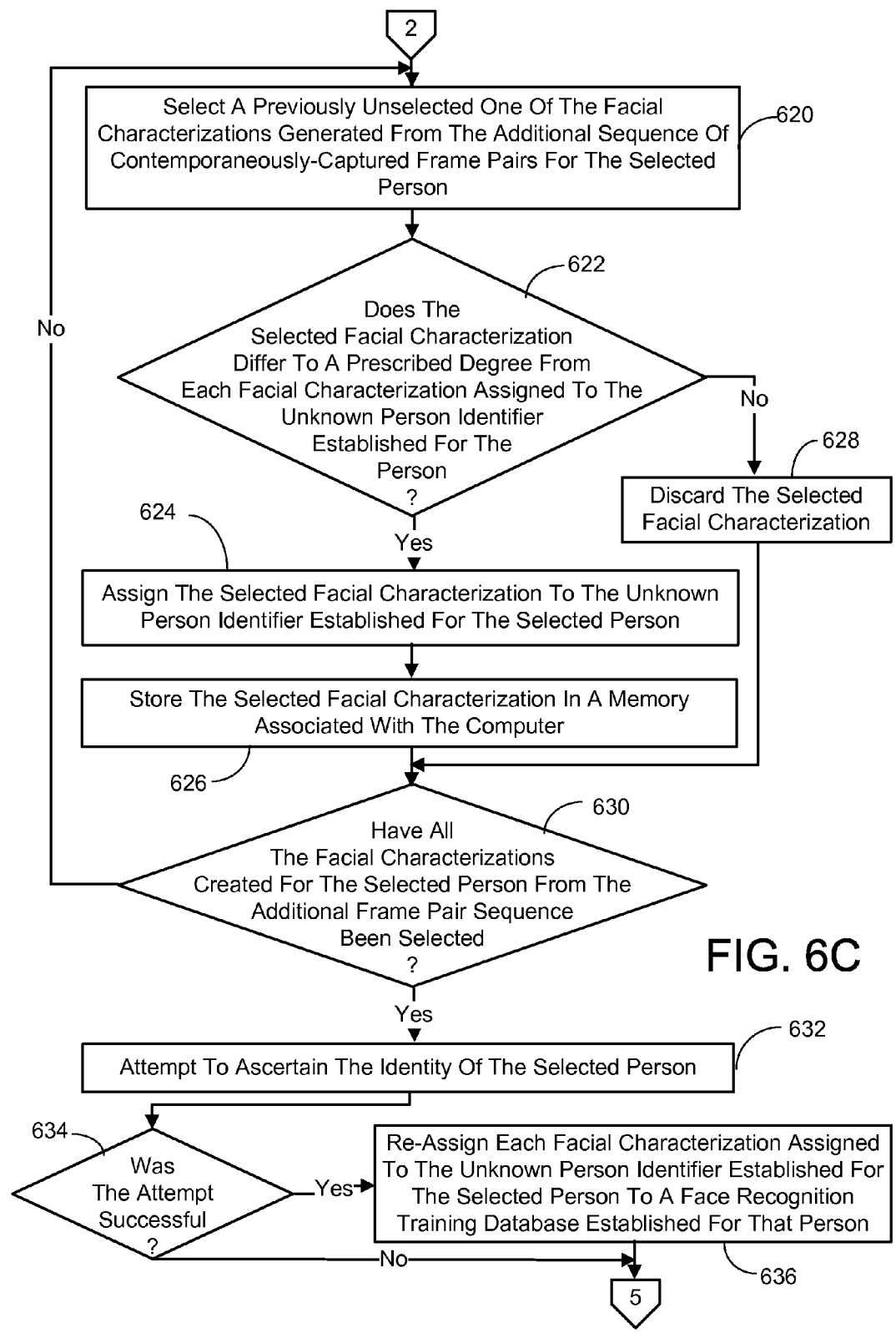
Figure 6D:
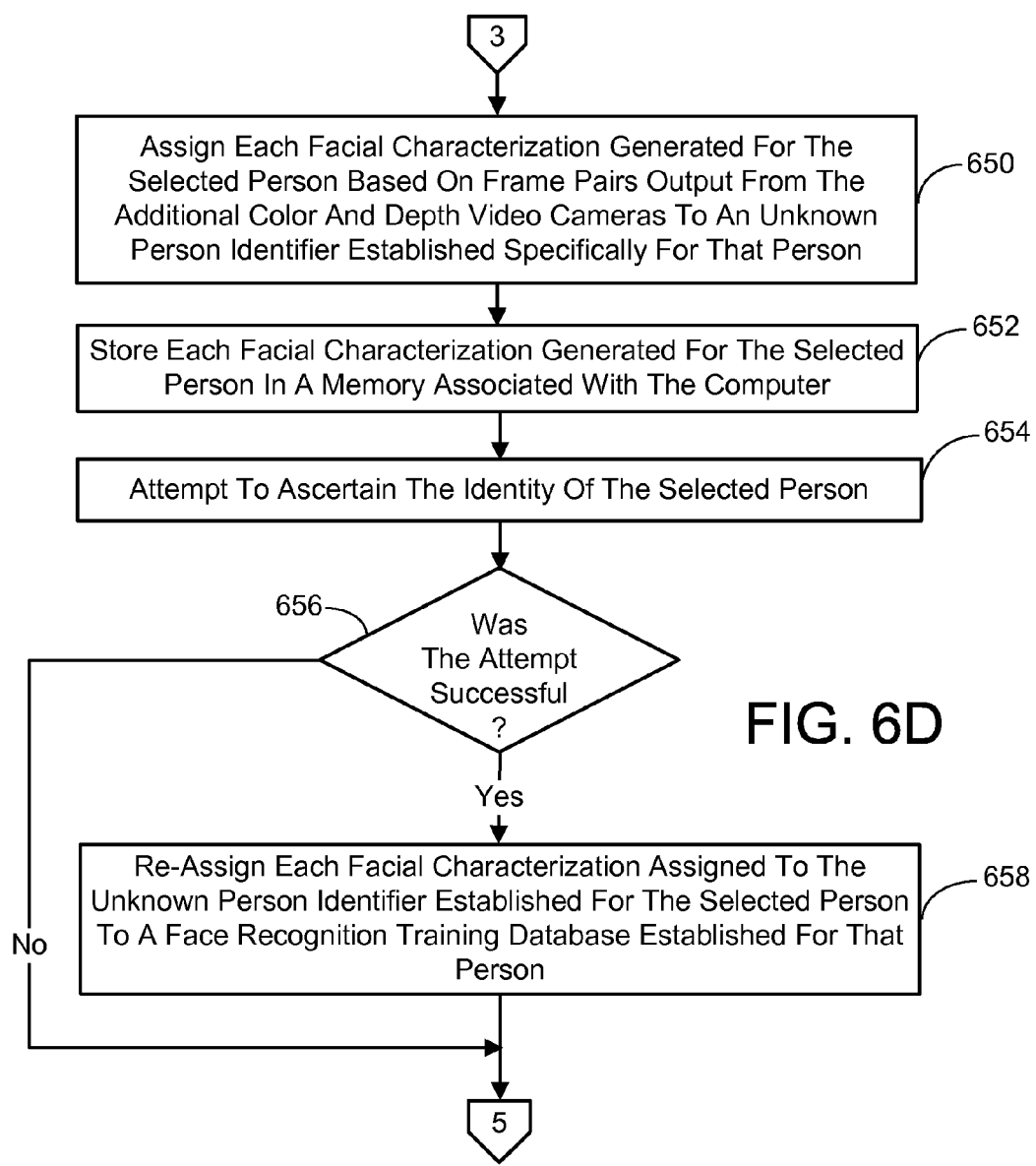
Figure 6F:
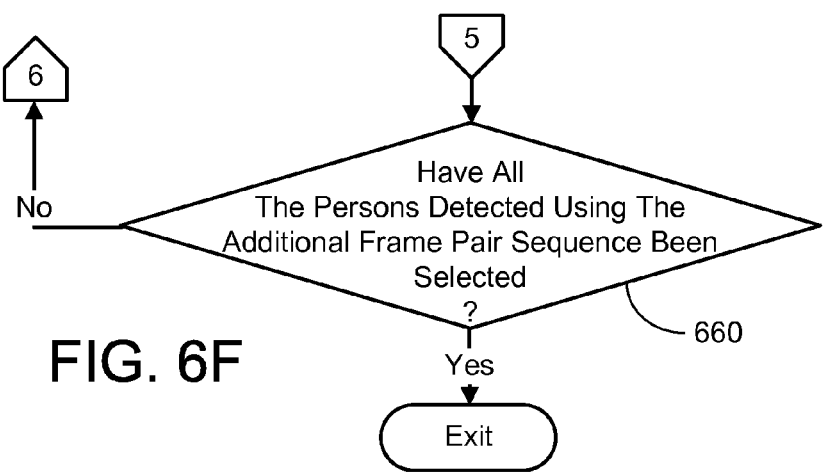
Figure 6E:
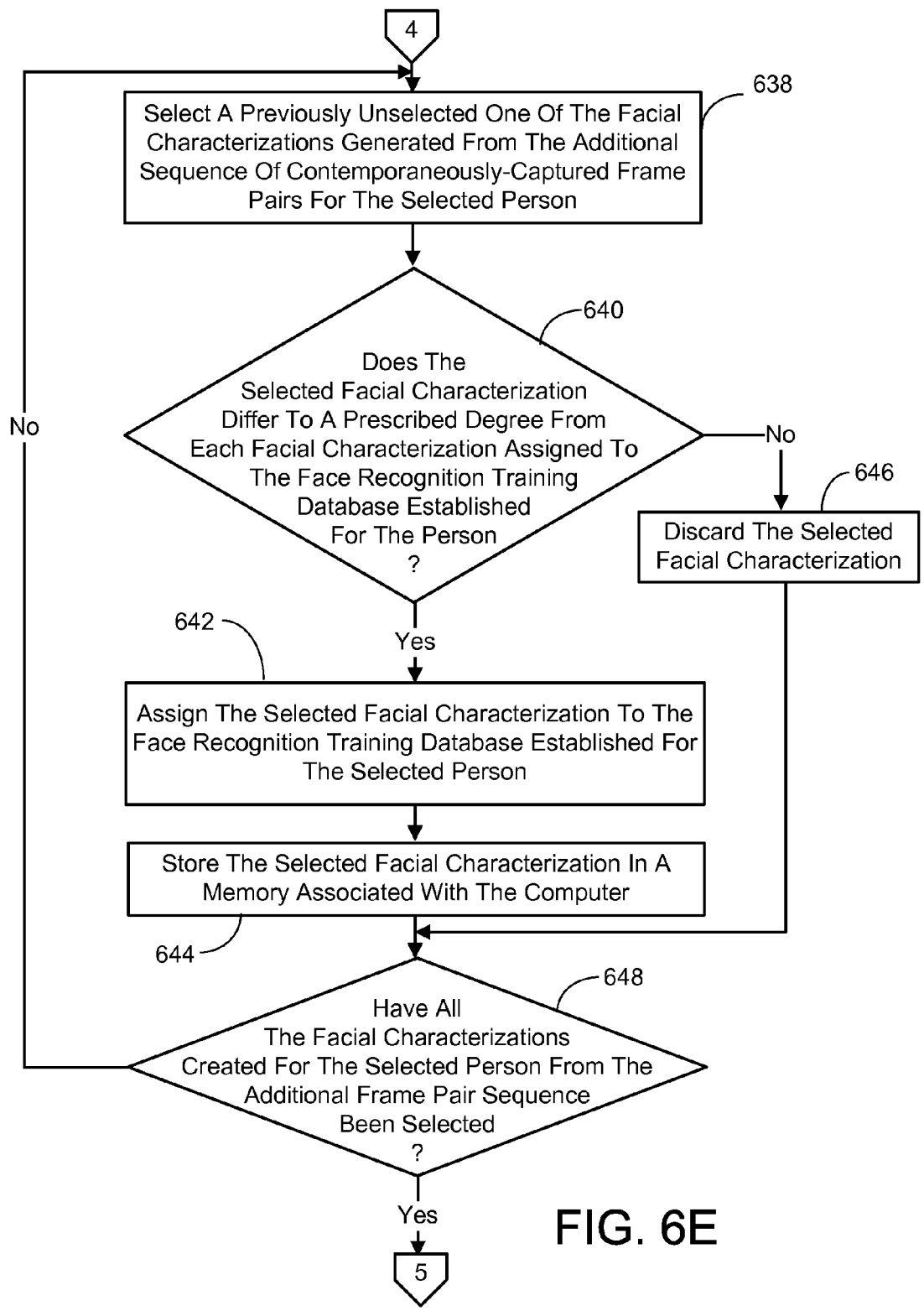
Figure 7A:
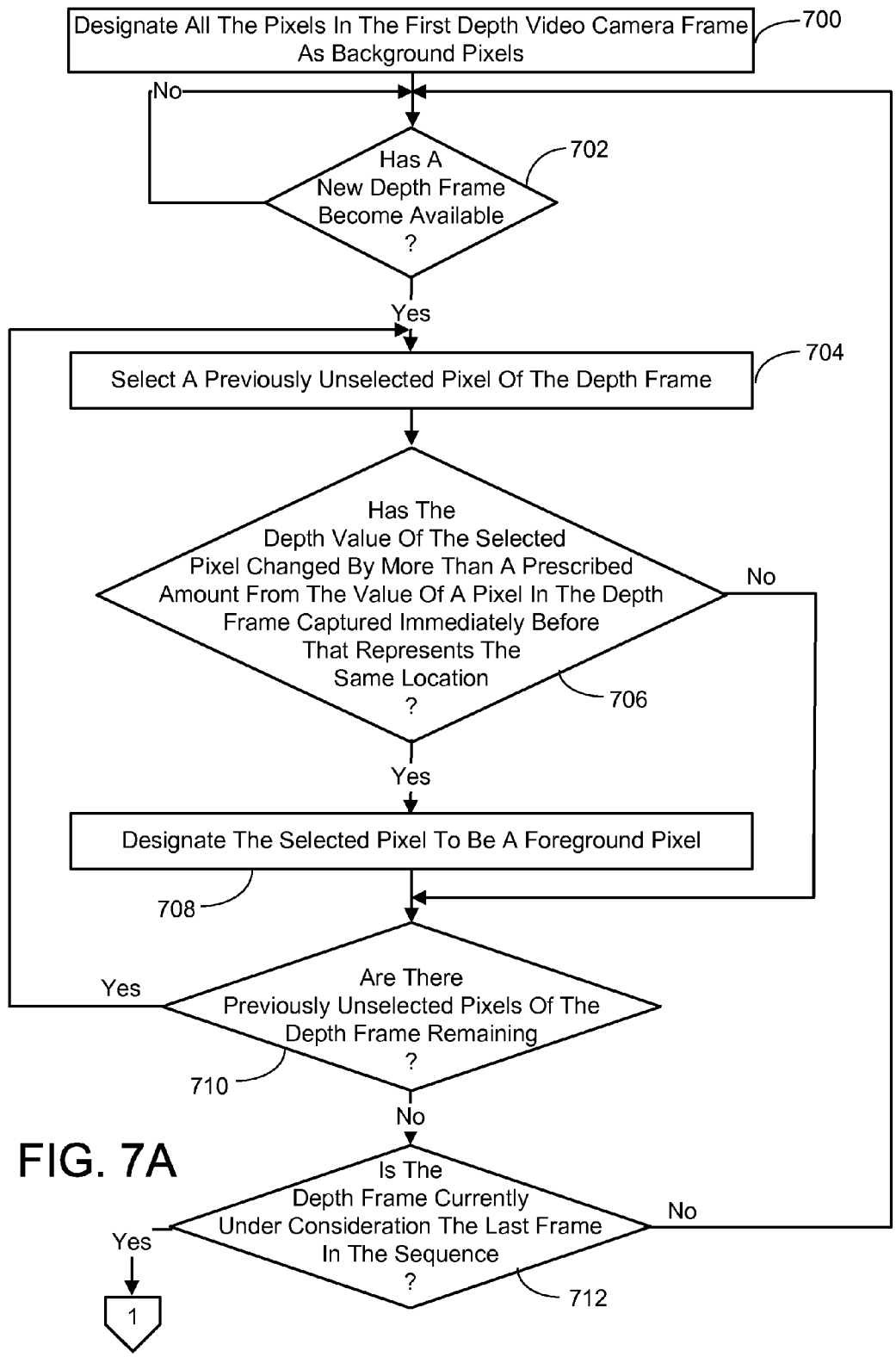
FIGS. 7A-D are a flow diagram generally outlining one embodiment of a computer-implemented motion detection process for use in the face recognition training database generation technique embodiments described herein.
Figure 7B:
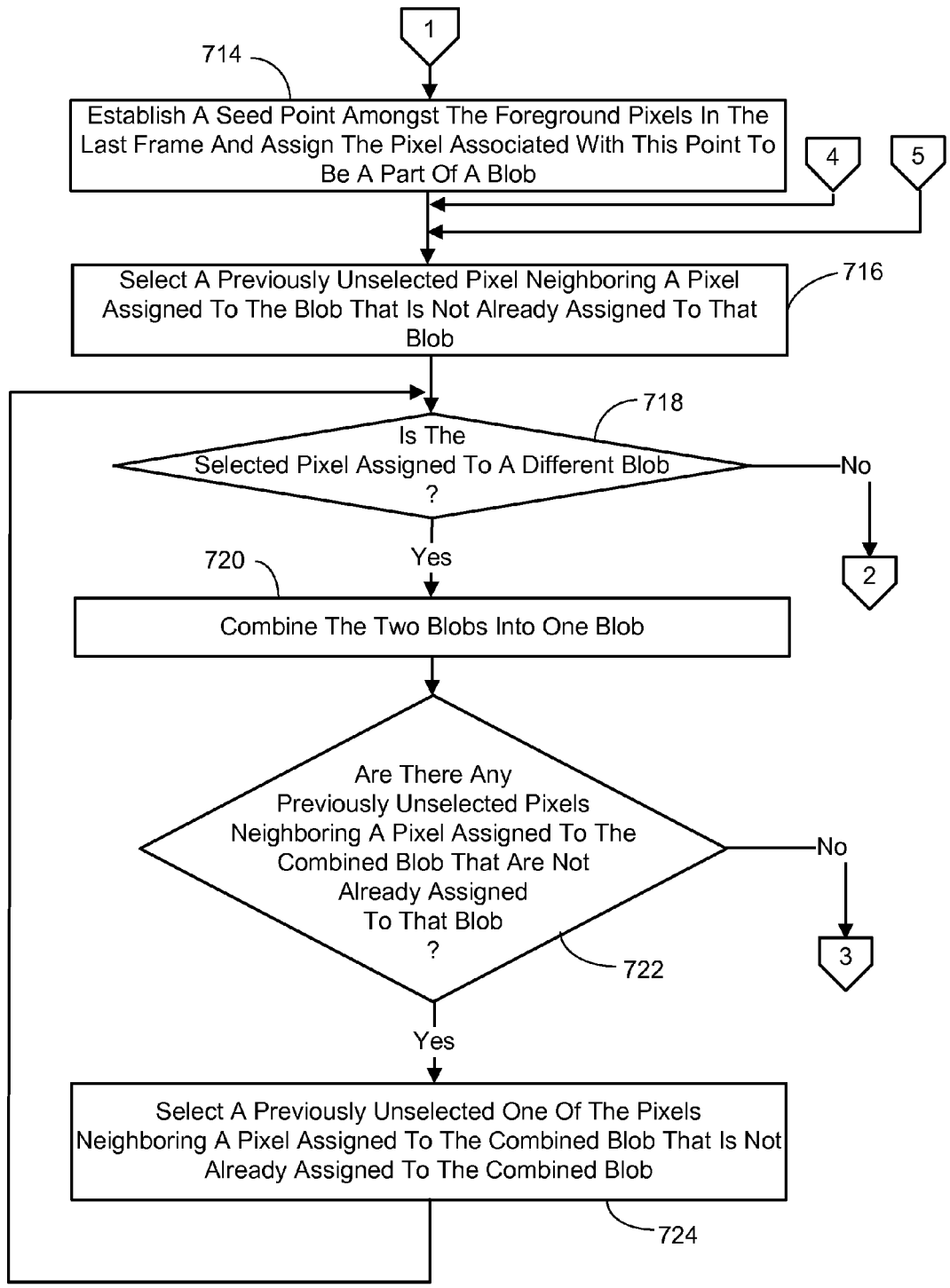
Figure 7C:
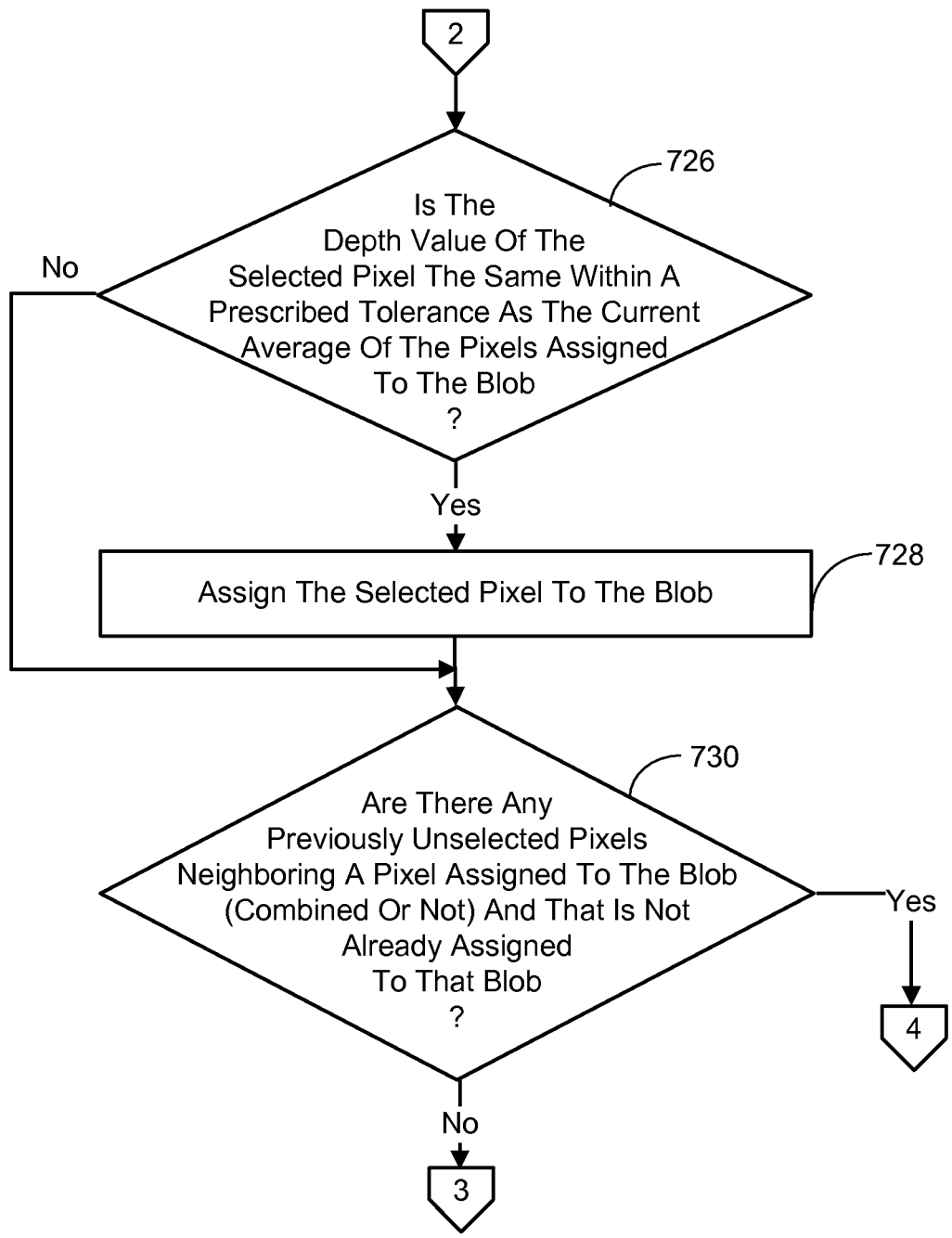
Figure 7D:
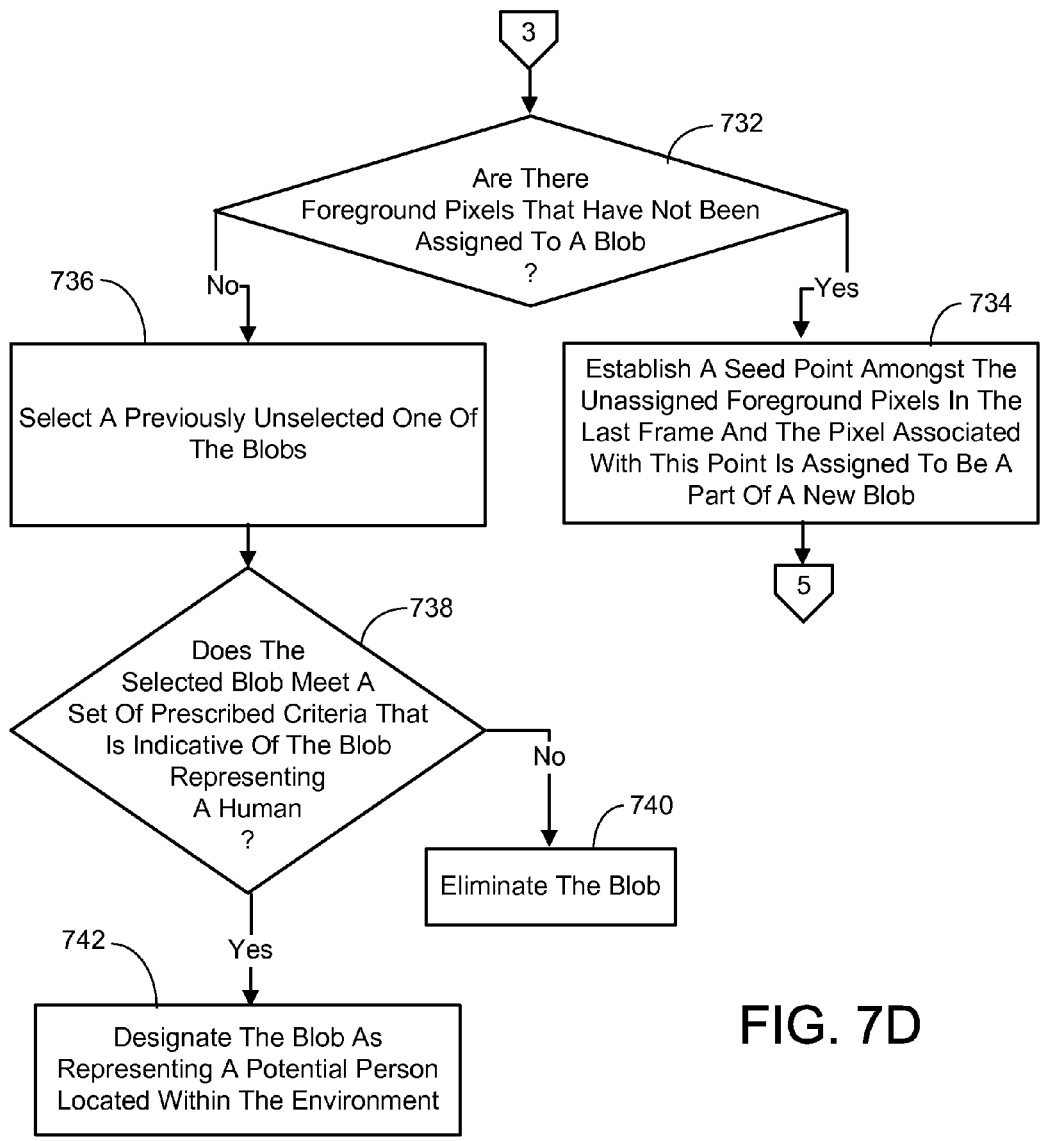

More particularly, referring to FIGS. 5A-C, for each additional pair of color and depth video cameras capturing the scene from a different point of view, an additional sequence of contemporaneously-captured frame pairs is input (process action 500). Next, a face detection method and the color video camera frames output by the color video camera of the additional pair of cameras are used to detect potential persons in the environment (process action 502). In addition, a motion detection method and the depth video camera frames output by the depth video camera of the additional pair of cameras are used to detect potential persons in the environment (process action 504). Detection results generated via the foregoing face and motion detection methods are used to determine the location of one or more persons in the environment (process action 506). The detection results generated via the face detection method also include a facial characterization of the portion of a color video camera frame depicting a person's face, for each potential person detected.

Each person detected solely via the motion detection method is identified next (process action 508), and the corresponding location of each identified person is found in the contemporaneously-captured frame of the color video camera of the additional pair of cameras (process action 510). In addition, a facial characterization of that portion of the color video camera frame is generated for each of the identified persons (process action 512).

The process continues with the selection of a previously unselected one of the persons detected in the environment based on frame pairs output from the additional color and depth video camera pair (process action 514). It is then determined based on identified location of the person whether the person has also been detected using another color and depth video camera pair (process action 516). If so, each facial characterization generated for the selected person based on frame pairs output from the additional color and depth video camera pair is assigned to the unknown person identifier established for that person based on the person's detection using the other color and depth video camera pair (process action 518). Otherwise, each facial characterization generated for the selected person based on frame pairs output from the additional color and depth video camera pair is assigned to an unknown person identifier established for that person (process action 520). In either case, each of the facial characterizations generated for the selected person based on frame pairs output from the additional color and depth video camera pair is stored in the memory associated with the computer (process action 522). In addition, an attempt is also made to ascertain the identity of the person (process action 524). It is then determined if the attempt was successful (process action 526). If so, each facial characterization assigned to the unknown person identifier established for the selected person is re-assigned to a face recognition training database established for that person (process action 528). Regardless of whether the attempt of process action 526 was successful or not, it is next determined if all the detected persons have been selected (process action 530). If not, process actions 514 through 530 are repeated, until all the detected persons have been selected and considered. At that point the process ends, but can be repeated whenever a new sequence of contemporaneously-captured frame pairs is input from the additional pair of color and depth video cameras.

1.3.2 Capturing a Different Scene

It is also possible given that more than one pair of cameras is available in the environment, the camera pairs can be configured to capture different scenes. This configuration is useful in situations where a pair of cameras cannot cover the entire environment. Given this, a person detected in one scene covered by one camera pair can be tracked and if that person moves into a part of the environment covered by another camera pair, the knowledge of the person's location as they leave one scene to another can be used to ascertain that a person detected in the new scene is the same person detected in the prior scene. In addition, face recognition methods, or some other method of identifying the person, can be employed if feasible to ascertain that a person detected in the new scene is the same person detected in the prior scene. This facilitates assigning facial characterizations generated for the person in the new part of the environment to the correct unknown person identifier (or the correct face recognition training database if the person was previously identified).

More particularly, referring to FIGS. 6A-F, given an additional pair of color and depth video cameras capturing a different scene within the environment, an additional sequence of contemporaneously-captured frame pairs is input (process action 600). Next, a face detection method and the color video camera frames output by the color video camera of the additional pair of cameras are used to detect potential persons in the environment (process action 602). In addition, a motion detection method and the depth video camera frames output by the depth video camera of the additional pair of cameras are used to detect potential persons in the environment (process action 604). Detection results generated via the foregoing face and motion detection methods are used to determine the location of one or more persons in the environment (process action 606). The detection results generated via the face detection method also include a facial characterization of the portion of a color video camera frame depicting a person's face, for each potential person detected.

Each person detected solely via the motion detection method is identified next (process action 608), and the corresponding location of each identified person is found in the contemporaneously-captured frame of the color video camera of the additional pair of cameras (process action 610). In addition, a facial characterization of that portion of the color video camera frame is generated for each of the identified persons (process action 612).

The process continues with the selection of a previously unselected one of the persons detected in the environment based on frame pairs output from the additional color and depth video camera pair (process action 614). It is then determined whether the selected person was previously detected in another scene in the environment using another color and depth video camera pair (process action 616). As indicated previously, this can be based on the tracking of the person's location as they leave one scene to another, face recognition methods, or some other method of identifying the person. If the selected person was previously detected in another scene, it is further determined if the identity of the selected person was ascertained previously (process action 618). If the selected person was not previously identified, then a previously unselected one of the facial characterizations generated from the additional sequence of contemporaneously-captured frame pairs, is selected (process action 620), and it is determined if the selected facial characterization differs to a prescribed degree from each facial characterization assigned to the unknown person identifier established previously for the selected person (process action 622). If so, the selected facial characterization is assigned to the unknown person identifier established previously for the person (process action 624), and stored in a memory associated with the computer (process action 626). Otherwise it is discarded (process action 628). It is then determined if all the facial characterizations generated from the additional sequence of contemporaneously-captured frame pairs have been selected (process action 630). If not, process actions 620 through 630 are repeated, until all the facial characterizations have been selected and considered. Next, an attempt is made to ascertain the identity of the selected person (process action 632). It is then determined if the attempt was successful (process action 634). If so, each facial characterization assigned to the unknown person identifier established for the selected person is re-assigned to a face recognition training database established for that person (process action 636).

However, if in process action 618 it is determined that the selected person was previously identified, then a previously unselected one of the facial characterizations generated from the additional sequence of contemporaneously-captured frame pairs, is selected (process action 638), and it is determined if the selected facial characterization differs to a prescribed degree from each facial characterization assigned to the face recognition training database established previously for the selected person (process action 640). If so, the selected facial characterization is assigned to the face recognition training database established for the person (process action 642) and stored in a memory associated with the computer (process action 644). Otherwise it is discarded (process action 646). It is then determined if all the facial characterizations generated from the additional sequence of contemporaneously-captured frame pairs have been selected (process action 648). If not, process actions 638 through 648 are repeated, until all the facial characterizations have been selected and considered.

However, if in process action 616, it was determined that the selected person was not previously detected in another scene in the environment, the process continues by assigning each facial characterization generated for the selected person based on frame pairs output from the additional color video camera and additional depth video camera to an unknown person identifier newly established for that person (process action 650). Each of these facial characterizations is also stored in a memory associated with the computer (process action 652). An attempt to ascertain the identity of the selected person is then made (process action 654). It is then determined if the attempt was successful (process action 656). If the identity of the selected person is ascertained, each facial characterization assigned to the unknown person identifier established for the person is re-assigned to a face recognition training database established for the person (process action 658).

Once the selected person has been considered as described above, it is determined if all the detected persons have been selected (process action 660). If not, process actions 614 through 660 are repeated, until all the detected persons have been selected and considered. At that point the process ends, but can be repeated whenever a new sequence of contemporaneously-captured frame pairs is input from the additional pair of color and depth video cameras.

1.4 Motion Detection

While any motion detection method can be adopted for use in the face recognition training database generation technique embodiments described herein, in one embodiment the following method is employed. In general, this method exploits short term changes in the depth data extracted from the depth video camera frames to detect potential persons in the environment.

More particularly, referring to FIGS. 7A-D, in one embodiment the motion detection process first involves designating all the pixels in the first depth video camera frame as background pixels (process action 700). Then, it is determined if a new subsequently-captured depth frame has become available (process action 702). If not, process action 702 is repeated until a new frame is available. When a new depth frame is input, a previously unselected pixel of the depth frame is selected (process action 704), and it is determined if the depth value of the selected pixel has changed by more than a prescribed amount from the value of a pixel in the depth frame captured immediately before the frame currently under consideration that represents the same location within the environment (process action 706). If the depth value has changed more than the prescribed amount, then the selected pixel is designated to be a foreground pixel (process action 708). It is next determined if there are any previously unselected pixels of the depth frame remaining (process action 710). If there are remaining pixels, process actions 704 through 710 are repeated. If not, then it is determined if the depth frame currently under consideration is the last frame in the sequence (process action 712). If not, process actions 702 through 712 are repeated.

However, if it is the last frame, then a seed point is established amongst the foreground pixels in the last frame and the pixel associated with this point is assigned to be a part of a blob (process action 714). Next, a previously unselected pixel neighboring a pixel assigned to the blob (which would initially be just the seed point pixel) and that is not already assigned to that blob, is selected (process action 716). It is first determined if the selected pixel is assigned to a different blob (process action 718). If so, the two blobs are combined into one blob (process action 720). Next, it is determined if there are any previously unselected pixels neighboring a pixel assigned to the combined blob that is not already assigned to the combined blob (process action 722). If so, then a previously unselected one of these pixels is selected (process action 724), and process action 718 through 724 are repeated. However, whenever it was determined in process action 718 that the selected pixel was not assigned to a different blob, it is determined if the depth value of the selected pixel is the same within a prescribed tolerance as the current average of the pixels assigned to the blob (process action 726). If so, the selected pixel is assigned to the blob (process action 728). If not, no action is taken. However, in either case, it is next determined if there are any previously unselected pixels neighboring a pixel assigned to the blob (combined or not) and that is not already assigned to that blob (process action 730). If there are such pixels, then process actions 716 through 730 are repeated. Otherwise, no action is taken. Thus, pixels surrounding the seed point pixel are each considered and either result in blobs being combined or the pixel being assigned to a blob if having the requisite depth value—then the pixels surrounding the enlarged blob (combined or otherwise) are considered, and so on to grow the blob. This continues until no neighboring pixel can be found that is unassigned to a blob and has a depth value that is the same within said prescribed tolerance of the current average of the pixels assigned to the blob.

Next, it is determined if there are foreground pixels that have not been assigned to a blob (process action 732). If such pixels remain, then a seed point is established amongst the unassigned foreground pixels in the last frame and the pixel associated with this point is assigned to be a part of a new blob (process action 734). Process actions 716 through 734 are then repeated, until no unassigned foreground pixels remain.

Once no unassigned foreground pixels remain (and so no new blobs can be formed), a previously unselected one of the blobs is selected (process action 736). It is then determined if the blob meets a set of prescribed criteria that is indicative of the blob representing a human (process action 738). If not, the blob is eliminated (process action 740). If, however, the selected blob does meet the prescribed criteria, the blob is designated as representing a potential person located within the environment (process action 742).

It is noted that the criteria used to indicative of a blob representing a human can be any conventional set of criteria. In addition, the criteria can include whether the blob fits normal human body parameters in real space dimensions. For example, does the blob exhibit rectangular areas corresponding to the human chest and head.

2.0 The Color and Depth Video Cameras

The aforementioned color and depth video cameras employed by the face recognition training database generation technique embodiments described herein will now be described in more detail. In general, the color video camera outputs a continuous sequence of digital color images of the scene captured by the camera. These images are sometimes referred to frames or image frames, as they were in the preceding descriptions. An example of a suitable color video camera is a conventional RGB video camera. The depth video camera outputs a continuous sequence of digital depth images of the scene captured by the camera. These images are sometimes referred to herein as frames or depth frames, as they were in the preceding descriptions. The pixel values in a depth frame are indicative of the distance between the depth camera and an object in the environment. For example, one suitable depth video camera is a conventional infrared-based depth camera. This type of camera projects a known infrared pattern onto the environment and determines depth based on the pattern's deformation as captured by an infrared imager.

As described previously, embodiments of the face recognition training database generation technique described herein can use pixel correlations between a contemporaneously captured pair of color and depth frames. In other words, knowing which pixel in one of the frames of the pair depicts the same location in the scene as a given pixel in the other frame is sometimes useful. While conventional methods can be employed to ascertain this pixel correlation each time a pair of contemporaneous frames is captured, in one embodiment a pre-computed transform that defines the pixel coordination is employed. More particularly, if the color and depth video cameras are synchronized such that they are moved together in the same manner, the relative transformation between them will not change. As such, the transformation can be pre-computed and used to determine the pixel correlation for each pair of contemporaneous frames captured.

The face recognition training database generation technique embodiments described herein can also employ fixed-location color and depth video cameras. By fixed-location it is meant that the cameras are disposed at a particular location within the environment, and do not move from that location on their own. This, of course, does not preclude the cameras from being relocated within the environment. However, it is envisioned that they remain in the same location during operation. In addition, while the fixed location cameras do not move location, this does not mean that the cameras cannot be panned, tilted, rotated or zoomed while in that location.

Figure 8:
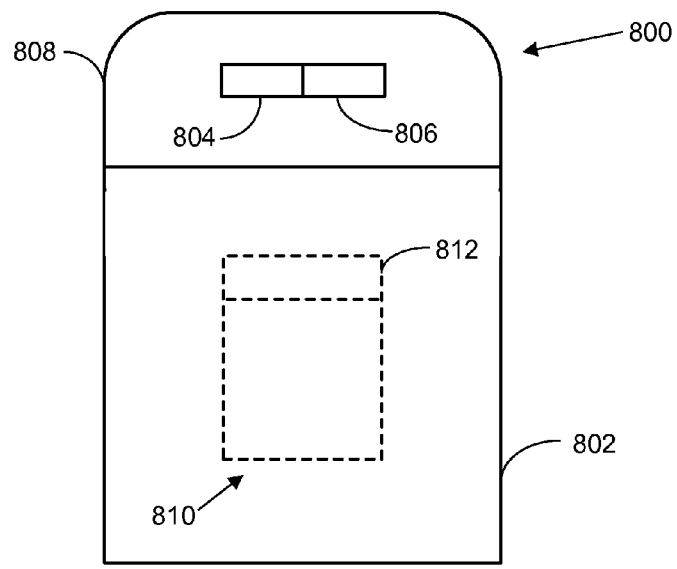
FIG. 8 is a simplified component diagram of a suitable mobile robotic device in which the face recognition training database generation technique embodiments described herein can be implemented.

Alternately, the face recognition training database generation technique embodiments described herein can employ moving color and depth video cameras. For example, the cameras can be mounted in a mobile robotic device. A suitable mobile robotic device can in general be any conventional mobile robotic device that exhibits the following attributes. First, referring to FIG. 8, the robotic device 800 is able to move about the environment in which it is intended to travel. Thus, the mobile robotic device 800 includes a locomotive section 802 for moving the device through the environment.

The mobile robotic device 800 also has sensors that are employed to track and follow people through the applicable environment. In particular, these sensors include the aforementioned color video camera 804 and depth video camera 806. The color and depth video cameras 804, 806 are repositionable so that different portions of the environment can be captured. To this end, the color and depth video cameras 804, 806 can be housed in a head section 808 of the mobile robotic device 800 that typically is disposed above the aforementioned locomotive section 802. The point of view of the cameras 804, 806 can be changed by redirecting the cameras themselves, or by moving the head section 808, or both. An example of the latter scenario is a configuration where the head section rotates about a vertical axis to provide a 360 degree panning motion, while the cameras pivot up and down to provide a tilting motion. The cameras also have a zoom feature.

The mobile robotic device 800 also includes a control unit 810 that controls the locomotive section 802 to move the robotic device through the environment in a conventional manner; and controls the movement of the head section 808, or the cameras 804, 806, or both, to capture different scenes within the environment. In addition, the control unit 810 includes a computing device 812 (such as those described in the Exemplary Operating Environments section of this disclosure). This computing device 812 includes a control module that is responsible for initiating movement control signals to the locomotive and head sections, and for using the frames captured by the color and depth video cameras in the manner described previously to generate face recognition training databases. The control of the movement of the locomotive and head sections is done using conventional methods. Whereas, the latter function is handled by a face recognition training database generation sub-module.

It is noted that in operation, the motion detection process described previously in connection with FIG. 7A-D, would be performed when the mobile robotic device is stationary and the cameras are not moving (e.g., no panning, tilting, rotating or zooming). This prevents false positives due to relative motion of the cameras.

3.0 Exemplary Operating Environments

Figure 9:
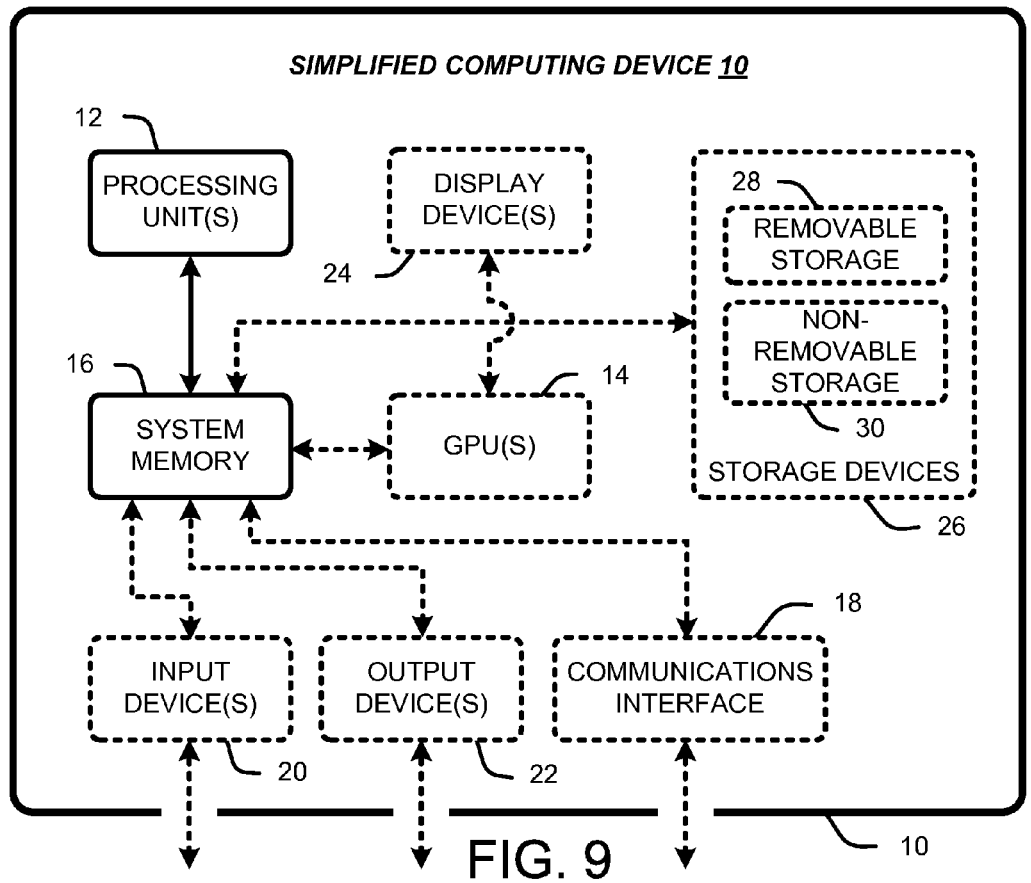
FIG. 9 is a diagram depicting a general purpose computing device constituting an exemplary system for implementing face recognition training database generation technique embodiments described herein.

The face recognition training database generation technique embodiments described herein are operational within numerous types of general purpose or special purpose computing system environments or configurations. FIG. 9 illustrates a simplified example of a general-purpose computer system on which various embodiments and elements of the face recognition training database generation technique, as described herein, may be implemented. It should be noted that any boxes that are represented by broken or dashed lines in FIG. 9 represent alternate embodiments of the simplified computing device, and that any or all of these alternate embodiments, as described below, may be used in combination with other alternate embodiments that are described throughout this document.

For example, FIG. 9 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement the face recognition training database generation technique embodiments described herein, the device should have a sufficient computational capability and system memory to enable basic computational operations. In particular, as illustrated by FIG. 9, the computational capability is generally illustrated by one or more processing unit(s) 12, and may also include one or more GPUs 14, either or both in communication with system memory 16. Note that that the processing unit(s) 12 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 9 may also include other components, such as, for example, a communications interface 18. The simplified computing device of FIG. 9 may also include one or more conventional computer input devices 20 (e.g., pointing devices, keyboards, audio input devices, video input devices, haptic input devices, devices for receiving wired or wireless data transmissions, etc.). The simplified computing device of FIG. 9 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 9 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying some or all of the various face recognition training database generation technique embodiments described herein, or portions thereof, may be stored, received, transmitted, or read from any desired combination of computer or machine readable media or storage devices and communication media in the form of computer executable instructions or other data structures.

Finally, the face recognition training database generation technique embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

4.0 Other Embodiments

In the foregoing descriptions of the face recognition training database generation technique embodiments, a depth video camera and a motion detection method that uses depth frames from such a camera were employed. However, there are also conventional motion detection methods that can detect persons in an environment using just a color video camera. Given this, in an alternate embodiment, the depth video camera is eliminated and just the color video camera is used to detect potential persons in the environment. Thus, the process described previously would be modified such that a sequence of frames output from a color video camera is input. These image frames are then used in conjunction with a face detection method to detect potential persons in an environment, and in conjunction with an appropriate motion detection method to also detect potential persons in the environment. Likewise, when new sequences of frames are employed as described previously, these too would just be new sequences of frames output from the color video camera.

It is further noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for generating a face recognition training database for each person detected as being located in an environment, comprising:
using a computer to perform the following process actions:
(a) inputting a sequence of contemporaneously-captured frame pairs, each frame pair comprising a frame output from a color video camera and a frame output from a depth video camera;
(b) using a face detection method and the color video camera frames to detect potential persons in a environment;
(c) using a motion detection method and the depth video camera frames to detect potential persons in the environment;
(d) using detection results generated via the face detection method and motion detection method to determine the location of one or more persons in the environment, said detection results generated via the face detection method comprising for each person detected, a facial characterization of the portion of a color video camera frame depicting the person's face;
(e) for each person detected solely via the motion detection method,
identifying the corresponding location of that person in the contemporaneously-captured frame of the color video camera,
generating said facial characterization of the portion of the color video camera frame depicting that person's face;
(f) for each person detected in the environment,
assigning each facial characterization generated for that person to an unknown person identifier established for the person,
storing each of said facial characterizations in a memory associated with the computer,
attempting to ascertain the identity of the person, and
whenever the identity of the person is ascertained, re-assigning each facial characterization assigned to the unknown person identifier established for the person to a face recognition training database established for that person.

2. The process of claim 1, further comprising:
inputting a new sequence of contemporaneously-captured frame pairs, each frame pair comprising a frame output from a color video camera and a frame output from a depth video camera;
repeating process actions (b) through (e);
for each person detected in the environment and depicted in the new sequence of contemporaneously-captured frame pairs,
determining if the person corresponds to a person whose location was previously determined using a sequence of contemporaneously-captured frame pairs preceding said new sequence,
whenever it is determined that the person corresponds a person whose location was previously determined using a sequence of contemporaneously-captured frame pairs preceding said new sequence, determining if the identity of the person was previously ascertained,
whenever it is determined the identity of the person was previously ascertained, for each facial characterization generated from said new sequence of contemporaneously-captured frame pairs, determining if the facial characterization differs to a prescribed degree from each facial characterization assigned to the face recognition training database established for the person,
for each facial characterization generated from said new sequence of contemporaneously-captured frame pairs, whenever it is determined that the facial characterization differs to a prescribed degree from each facial characterization assigned to the face recognition training database established for the person, assigning that facial characterization to the face recognition training database established for the person and storing that facial characterization in a memory associated with the computer.

3. The process of claim 2, wherein the color video camera and depth video camera are disposed on a mobile robotic device which is capable of moving about the environment, and wherein the new sequence of contemporaneously-captured frame pairs was captured from a point of view within the environment that is different from the point of view that previous-captured frame pairs were captured, said new point of view being achieved by at least one of, the mobile robotic device changing the direction the color and depth video cameras are pointing without changing location within the environment, or the mobile robotic device changing location within the environment.

4. The process of claim 1, further comprising:
inputting a new sequence of contemporaneously-captured frame pairs, each frame pair comprising a frame output from a color video camera and a frame output from a depth video camera;
repeating process actions (b) through (e);
for each person detected in the environment and depicted in the new sequence of contemporaneously-captured frame pairs,
determining if the person corresponds to a person whose location was previously determined using a sequence of contemporaneously-captured frame pairs preceding said new sequence,
whenever it is determined that the person corresponds a person whose location was previously determined using a sequence of contemporaneously-captured frame pairs preceding said new sequence, determining if the identity of the person was previously ascertained,
whenever it is determined the identity of the person was not previously ascertained, for each facial characterization generated from said new sequence of contemporaneously-captured frame pairs, determining if the facial characterization differs to a prescribed degree from each facial characterization assigned to the unknown person identifier established for the person,
for each facial characterization generated from said new sequence of contemporaneously-captured frame pairs, whenever it is determined that the facial characterization differs to a prescribed degree from each facial characterization assigned to the unknown person identifier established for the person,
assigning that facial characterization to the unknown person identifier established for the person and storing that facial characterization in a memory associated with the computer,
attempting to ascertain the identity of the person, and
whenever the identity of the person is ascertained, re-assigning each facial characterization assigned to the unknown person identifier established for the person to a face recognition training database established for that person.

5. The process of claim 4, wherein the color video camera and depth video camera are disposed on a mobile robotic device which is capable of moving about the environment, and wherein the new sequence of contemporaneously-captured frame pairs was captured from a point of view within the environment that is different from the point of view that previous-captured frame pairs were captured, said new point of view being achieved by at least one of, the mobile robotic device changing the direction the color and depth video cameras are pointing without changing location within the environment, or the mobile robotic device changing location within the environment.

6. The process of claim 1, further comprising:
inputting a new sequence of contemporaneously-captured frame pairs, each frame pair comprising a frame output from a color video camera and a frame output from a depth video camera;
repeating process actions (b) through (e);
for each person detected in the environment and depicted in the new sequence of contemporaneously-captured frame pairs,
determining if the person corresponds to a person whose location was previously determined using a sequence of contemporaneously-captured frame pairs preceding said new sequence,
whenever it is determined that the person corresponds a person whose location was previously determined using a sequence of contemporaneously-captured frame pairs preceding said new sequence, determining if the identity of the person was previously ascertained,
whenever it is determined the identity of the person was not previously ascertained, determining how many times a sequence of contemporaneously-captured frame pairs had been input and processed without the identity of the person being ascertained, and determining if the number of times exceeds a prescribed maximum number,
whenever it is determined that the number of times a sequence of contemporaneously-captured frame pairs had been input and processed without the identity of the person being ascertained exceeds the prescribed maximum number, deleting from said memory each facial characterization assigned to the unknown person identifier established for the person.

7. The process of claim 1, further comprising:
inputting a new sequence of contemporaneously-captured frame pairs, each frame pair comprising a frame output from a color video camera and a frame output from a depth video camera;
repeating process actions (b) through (e);
for each person detected in the environment and depicted in the new sequence of contemporaneously-captured frame pairs,
determining if the person corresponds to a person whose location was previously determined using a sequence of contemporaneously-captured frame pairs preceding said new sequence,
whenever it is determined that the person does not correspond a person whose location was previously determined using a sequence of contemporaneously-captured frame pairs preceding said new sequence,
assigning each facial characterization generated for that person to an unknown person identifier established for the person,
storing each of said facial characterizations in a memory associated with the computer,
attempting to ascertain the identity of the person, and
whenever the identity of the person is ascertained, re-assigning each facial characterization assigned to the unknown person identifier established for the person to a face recognition training database established for that person.

8. The process of claim 7, wherein the color video camera and depth video camera are disposed on a mobile robotic device which is capable of moving about the environment, and wherein the new sequence of contemporaneously-captured frame pairs was captured from a point of view within the environment that is different from the point of view that previous-captured frame pairs were captured, said new point of view being achieved by at least one of, the mobile robotic device changing the direction the color and depth video cameras are pointing without changing location within the environment, or the mobile robotic device changing location within the environment.

9. The process of claim 1, further comprising performing, prior to performing the process action of assigning each facial characterization generated for the person to an unknown person identifier established for the person, the process actions of:
for each person detected at a distance from the color video camera that exceeds a prescribed maximum distance,
providing the location of the person to a controller that controls a color camera having zoom capability, said controller being capable of, based on the person's location, zooming in on the face of the person to a degree proportional to the distance from the color video camera to the person, and capturing a zoomed image of the person's face,
inputting said zoomed image of the person's face, and generating said facial characterization of the portion of the zoomed image depicting that person's face.

10. The process of claim 1, wherein the process action of attempting to ascertain the identity of the person, comprises an action of employing the facial characterizations generated for that person and assigned to an unknown person identifier established for the person in attempting to ascertain the identity of the person.

11. The process of claim 1, further comprising the process actions of:
inputting an additional sequence of contemporaneously-captured frame pairs, each additional frame pair comprising a frame output from an additional color video camera and a frame output from an additional depth video camera, said additional color and depth video cameras capturing the same scene in the environment as the other color and depth video cameras but from a different point of view and each additional frame pair being captured substantially contemporaneously with a frame pair output from the other color and depth video cameras;
using a face detection method and the frames from the additional color video camera to detect potential persons in a environment;
using a motion detection method and the frames from the additional depth video camera to detect potential persons in the environment;
using detection results generated via the face detection method and motion detection method to determine the location of one or more persons in the environment, said detection results generated via the face detection method comprising for each person detected, a facial characterization of the portion of the color video camera frame depicting the person's face;
for each person detected solely via the motion detection method,
identifying the corresponding location of that person in the contemporaneously-captured frame of the additional color video camera,
generating said facial characterization of the portion of the additional color video camera frame depicting that person's face;
for each person detected in the environment based on frame pairs output from the additional color video camera and additional depth video camera,
determining based on identified location of the person whether the person has also been detected using the other color and depth video cameras,
whenever it is determined that the person has also been detected using the other color and depth video cameras, assigning each facial characterization generated for that person based on frame pairs output from the additional color video camera and additional depth video camera to the unknown person identifier established for that person based on the person's detection using the other color and depth video cameras, and storing each of said facial characterizations generated for the person based on frame pairs output from the additional color video camera and additional depth video camera in the memory associated with the computer,
whenever it is determined that the person has not also been detected using the other color and depth video cameras, assigning each facial characterization generated for that person based on frame pairs output from the additional color video camera and additional depth video camera to an unknown person identifier established for that person, attempting to ascertain the identity of the person, and whenever the identity of the person is ascertained, re-assigning each facial characterization assigned to the unknown person identifier established for the person to a face recognition training database established for that person.

12. The process of claim 1, further comprising the process actions of:
inputting an additional sequence of contemporaneously-captured frame pairs, each additional frame pair comprising a frame output from an additional color video camera and a frame output from an additional depth video camera, said additional color and depth video cameras capturing a different scene in the environment than the other color and depth video cameras;
using a face detection method and the frames from the additional color video camera to detect potential persons in a environment;
using a motion detection method and the frames from the additional depth video camera to detect potential persons in the environment;
using detection results generated via the face detection method and motion detection method to determine the location of one or more persons in the environment, said detection results generated via the face detection method comprising for each person detected, a facial characterization of the portion of the color video camera frame depicting the person's face;
for each person detected solely via the motion detection method,
identifying the corresponding location of that person in the contemporaneously-captured frame of the additional color video camera, generating said facial characterization of the portion of the additional color video camera frame depicting that person's face;

for each person detected in the environment based on frame pairs output from the additional color video camera and additional depth video camera, determining if the person detected was previously detected in a different scene in the environment, if the person was previously detected in a different scene in the environment, determining if the identity of the person was previously ascertained, whenever it is determined the identity of the person was not previously ascertained, for each facial characterization generated from said additional sequence of contemporaneously-captured frame pairs, determining if the facial characterization differs to a prescribed degree from each facial characterization assigned to the unknown person identifier previously established for the person, for each facial characterization generated from said additional sequence of contemporaneously-captured frame pairs, whenever it is determined that the facial characterization differs to a prescribed degree from each facial characterization assigned to the unknown person identifier previously established for the person, assigning that facial characterization to the unknown person identifier previously established for the person and storing that facial characterization in a memory associated with the computer, attempting to ascertain the identity of the person, and whenever the identity of the person is ascertained, re-assigning each facial characterization assigned to the unknown person identifier established for the person to a face recognition training database established for that person, if the person was not previously detected in a different scene in the environment, assigning each facial characterization generated for that person based on frame pairs output from the additional color video camera and additional depth video camera to an unknown person identifier newly established for that person, storing each of said facial characterizations generated for that person based on frame pairs output from the additional color video camera and additional depth video camera in the memory associated with the computer, attempting to ascertain the identity of the person, and whenever the identity of the person is ascertained, re-assigning each facial characterization assigned to the unknown person identifier established for the person to a face recognition training database established for that person.

13. The process of claim 1, further comprising the process actions of:

inputting an additional sequence of contemporaneously-captured frame pairs, each additional frame pair comprising a frame output from an additional color video camera and a frame output from an additional depth video camera, said additional color and depth video cameras capturing a different scene in the environment than the other color and depth video cameras;

using a face detection method and the frames from the additional color video camera to detect potential persons in a environment;

using a motion detection method and the frames from the additional depth video camera to detect potential persons in the environment;

using detection results generated via the face detection method and motion detection method to determine the location of one or more persons in the environment, said detection results generated via the face detection method comprising for each person detected, a facial characterization of the portion of the color video camera frame depicting the person's face;

for each person detected solely via the motion detection method, identifying the corresponding location of that person in the contemporaneously-captured frame of the additional color video camera, generating said facial characterization of the portion of the additional color video camera frame depicting that person's face;

for each person detected in the environment based on frame pairs output from the additional color video camera and additional depth video camera, determining if the person detected was previously detected in a different scene in the environment, if the person was previously detected in a different scene in the environment, determining if the identity of the person was previously ascertained, whenever it is determined the identity of the person was previously ascertained, for each facial characterization generated from said additional sequence of contemporaneously-captured frame pairs, determining if the facial characterization differs to a prescribed degree from each facial characterization assigned to the face recognition training database established for the person, for each facial characterization generated from said additional sequence of contemporaneously-captured frame pairs, whenever it is determined that the facial characterization differs to a prescribed degree from each facial characterization assigned to the face recognition training database established for the person, assigning that facial characterization to the face recognition training database established for the person and storing that facial characterization in a memory associated with the computer.

14. The process of claim 1, wherein the process action of using a motion detection method and the depth video camera frames to detect potential persons in the environment, comprises the actions of:

designating all the pixels in the first depth video camera frame as background pixels;

for each pixel of each of the subsequently-captured depth frames contained in the sequence of contemporaneously-captured frame pairs, in the order in which the frame was captured;

identifying if the depth value of the pixel has changed more than a prescribed amount from the value of a pixel in the depth frame captured immediately before the frame currently under consideration that represents the same location within the environment;

whenever the depth value of the pixel has changed more than the prescribed amount, designating the pixel to be a foreground pixel;

once the last frame contained in the sequence of contemporaneously-captured frame pairs has been processed to identify if its pixel depth values have changed more than the prescribed amount, (i) establishing a seed point amongst the foreground pixels in said last frame and assigning the pixel associated therewith to be a part of a separate blob, (ii) recursively determining for each pixel neighboring a pixel assigned to the blob, which is not already assigned to that blob, if its depth value is the same within a prescribed tolerance as the current average of the pixels assigned to the blob, and if so, assigning that neighboring pixel to be a part of the blob, until no neighboring pixel can be found that is unassigned to a blob and which has a depth value that is the same within said prescribed tolerance of the current average of the pixels assigned to the blob, and (iii) whenever a neighboring pixel is found during the performance of the recursive determining action (ii) that is assigned to a different blob, combining the two blobs into one and continuing the recursive determining action (ii), and (iv) repeating process actions (i) through (iii) for the unassigned foreground pixels, until no more blobs can be formed once no more blobs can be formed, for each blob,
  determining if the blob meets a set of prescribed criteria that is indicative of the blob representing a human,
  eliminating each blob not meeting the set of prescribed criteria, and
  designating each remaining blob to represent a different potential person located within the environment.

15. The process of claim 1, further comprising:
inputting a new sequence of frames output from the color video camera;
repeating process actions (b) through (e);
for each person detected in the environment and depicted in the new sequence of frames output from a color video camera,
  determining if the person corresponds to a person whose location was previously determined using a sequence of color video camera frames which were capture before said new sequence,
    whenever it is determined that the person corresponds a person whose location was previously determined, ascertaining if the identity of the person was previously ascertained,
      whenever it is ascertained the identity of the person was previously ascertained, for each facial characterization generated from said new sequence of frames, determining if the facial characterization differs to a prescribed degree from each facial characterization assigned to the face recognition training database established for the person,
        for each facial characterization generated from said new sequence of frames, whenever it is determined that the facial characterization differs to a prescribed degree from each facial characterization assigned to the face recognition training database established for the person, assigning that facial characterization to the face recognition training database established for the person and storing that facial characterization in a memory associated with the computer.

16. The process of claim 1, further comprising:
inputting a new sequence of frames output from the color video camera;
repeating process actions (b) through (e);
for each person detected in the environment and depicted in the new sequence of frames output from the color video camera,
  determining if the person corresponds a person whose location was previously determined using a sequence of color video camera frames which were capture before said new sequence,
    whenever it is determined that the person corresponds a person whose location was previously determined, determining if the identity of the person was previously ascertained,
      whenever it is ascertained the identity of the person was not previously ascertained, for each facial characterization generated from said new sequence of frames, determining if the facial characterization differs to a prescribed degree from each facial characterization assigned to the unknown person identifier established for the person,
      or each facial characterization generated from said new sequence of frames, whenever it is determined that the facial characterization differs to a prescribed degree from each facial characterization assigned to the unknown person identifier established for the person,
        assigning that facial characterization to the unknown person identifier established for the person and storing that facial characterization in a memory associated with the computer,
        attempting to ascertain the identity of the person, and
        whenever the identity of the person is ascertained, re-assigning each facial characterization assigned to the unknown person identifier established for the person to a face recognition training database established for that person.

17. The process of claim 1, further comprising:
inputting a new sequence of frames output from the color video camera;
repeating process actions (b) through (e);
for each person detected in the environment and depicted in the new sequence of frames output from the color video camera,
  determining if the person corresponds a person whose location was previously determined using a sequence of color video camera frames which were capture before said new sequence,
    whenever it is determined that the person does not correspond a person whose location was previously determined,
      assigning each facial characterization generated for that person to an unknown person identifier established for the person,
      storing each of said facial characterizations in a memory associated with the computer,
      attempting to ascertain the identity of the person, and
      whenever the identity of the person is ascertained, re-assigning each facial characterization assigned to the unknown person identifier established for the person to a face recognition training database established for that person.

18. A computer-implemented process for generating a face recognition training database for each person detected as being located in an environment, comprising:
using a computer to perform the following process actions:
(a) inputting a sequence of frames output from a color video camera;
(b) using a face detection method and the color video camera frames to detect potential persons in a environment;
(c) using a motion detection method and the color video camera frames to detect potential persons in a environment;
(d) using detection results generated via the face detection method and motion detection method to determine the location of one or more persons in the environment, said detection results generated via the face detection method comprising for each person detected, a facial characterization of the portion of a color video camera frame depicting the person's face;
(e) for each person detected solely via the motion detection method,
locating a portion of a color video camera frame depicting that person's face, and
generating said facial characterization of the portion of the color video camera frame depicting that person's face;
(f) for each person detected in the environment,
assigning each facial characterization generated for that person to an unknown person identifier established for the person,
storing each of said facial characterizations in a memory associated with the computer,
attempting to ascertain the identity of the person, and
whenever the identity of the person is ascertained, re-assigning each facial characterization assigned to the unknown person identifier established for the person to a face recognition training database established for that person.

19. A computer-implemented process for detecting persons located in an environment, comprising:
using a computer to perform the following process actions:
inputting a sequence of frames output from a depth video camera;
designating all the pixels in the first depth video camera frame as background pixels;
for each pixel of each of the subsequently-captured depth frames contained in the sequence of frames, in the order in which the frame was captured;
identifying if the depth value of the pixel has changed more than a prescribed amount from the value of a pixel in the depth frame captured immediately before the frame currently under consideration that represents the same location within the environment;
whenever the depth value of the pixel has changed more than the prescribed amount, designating the pixel to be a foreground pixel;
once the last frame contained in the sequence of frames has been processed to identify if its pixel depth values have changed more than the prescribed amount,
(i) establishing a seed point amongst the foreground pixels in said last frame and assigning the pixel associated therewith to be a part of a separate blob,
(ii) recursively determining for each pixel neighboring a pixel assigned to the blob, which is not already assigned to that blob, if its depth value is the same within a prescribed tolerance as the current average of the pixels assigned to the blob, and if so, assigning that neighboring pixel to be a part of the blob, until no neighboring pixel can be found that is unassigned to a blob and which has a depth value that is the same within said prescribed tolerance of the current average of the pixels assigned to the blob, and
(iii) whenever a neighboring pixel is found during the performance of the recursive determining action (ii) that is assigned to a different blob, combining the two blobs into one and continuing the recursive determining action (ii), and
(iv) repeating process actions (i) through (iii) for the unassigned foreground pixels, until no more blobs can be formed,
once no more blobs can be formed, for each blob,
determining if the blob meets a set of prescribed criteria that is indicative of the blob representing a human,
eliminating each blob not meeting the set of prescribed criteria, and
designating each remaining blob to represent a different potential person located within the environment.

20. The process of claim 19, wherein the process action of determining if a blob meets a set of prescribed criteria that is indicative of the blob representing a human, comprises determining if at least a portion of the blob exhibits a substantially rectangular shape.

* * * * *